United States Patent [19]

Kurtzberg et al.

[11] 3,760,365

[45] Sept. 18, 1973

[54] MULTIPROCESSING COMPUTING SYSTEM WITH TASK ASSIGNMENT AT THE INSTRUCTION LEVEL

[75] Inventors: Jerome M. Kurtzberg, Yorktown Heights; Jack L. Rosenfeld, Ossining; Raymond D. Villani, Peekskill, all of N.Y.

[73] Assignee: International Business Machines Corporation, Armonk, N.Y.

[22] Filed: Dec. 30, 1971

[21] Appl. No.: 214,193

[52] U.S. Cl. .................. 340/172.5

[51] Int. Cl. .................. G06f 15/16

[58] Field of Search .................. 340/172.5; 235/157

[56] References Cited

UNITED STATES PATENTS

| | | | |
|---|---|---|---|
| 3,480,914 | 11/1969 | Schlaeppi | 340/172.5 |
| 3,496,551 | 2/1970 | Driscoll et al. | 340/172.5 |
| 3,445,822 | 5/1969 | Driscoll | 340/172.5 |
| 3,229,260 | 1/1966 | Falkoff | 340/172.5 |
| 3,348,210 | 10/1967 | Ochsner | 340/172.5 |
| 3,462,741 | 8/1969 | Bush et al. | 340/172.5 |
| 3,560,934 | 2/1971 | Ernst et al. | 340/172.5 |

*Primary Examiner*—Paul J. Henon
*Assistant Examiner*—Mark Edward Nusbaum
*Attorney*—Roy R. Schlemmer et al.

[57] ABSTRACT

The present invention relates to a multiprocessing system wherein job assignments to the respective processors are made at the level of very small tasks. Further, the system is organized so that none of the multiprocessing capabilities need be known either to the programmer or to a supervisory program. Task assignment is done at the instruction level. By instruction level is meant a typical computer's machine language. In the disclosed embodiment, two processors are shown; however, it is to be understood that the basic concepts of the present invention could well be extended to more than two processors. Each of these processors shares a main store, a microinstruction store and a local store. Further, automatic control of the two systems is performed with the use of a set of shared latches to prevent one of the processors from interfering with another, with resulting erroneous results. Maximum availability of the system is assured since the system may operate either in the multiprocessing mode or, in the event that one of the processors should fail, the other processor can continue operating completely autonomously.

16 Claims, 24 Drawing Figures

FIG. 3A

| | |
|---|---|
| A0 | SET LATCH |
| A1 | RESET LATCH |
| A2 | TEST AND SET LATCH TO "1" |
| A3 | READ LOCAL STORE DIRECT |
| A4 | WRITE LOCAL STORE DIRECT |
| A5 | READ LOCAL STORE INDIRECT |
| A6 | WRITE LOCAL STORE INDIRECT |
| A7 | READ MAIN STORE DIRECT |
| A8 | WRITE MAIN STORE DIRECT |
| A9 | READ MAIN STORE INDIRECT |
| A10 | WRITE MAIN STORE INDIRECT |
| A11 | TEST LATCH FOR "1" |
| A12 | TEST LATCH FOR "0" |
| A13 | BRANCH M WAY |
| A14 | AND |
| A15 | ADD |
| A16 | COMPARE |
| A17 | BRANCH ON RESULT OF ALU OPERATION ≠ 0 |
| A18 | DECREMENT |
| A19 | INCREMENT |
| A20 | MOVE |
| A21 | BRANCH UNCONDITIONAL |
| A22 | RESET REGISTER TO ALL ZERO'S |

FIG. 3B

| | LATCHES | REGISTERS |
|---|---|---|
| B0 | | R1 |
| B1 | SIP | R2 |
| B2 | BIP | R3 |
| B3 | EPL | R4 |
| B4 | ADRST | R5 |
| B5 | STDONE | COND. CODE (SHARED) |
| B6 | DECMD | |
| B7 | SUC | |
| B8 | CCLK | |
| B9 | IPL | |
| B10 | CCF (OWN) | |
| B11 | CCF (OTHER) | |
| B12 | AVAILABILITY F.F. (OWN) | |
| B13 | MAIN STORE BUSY | |
| B14 | DATA VALID (OWN) | |

FIG. 3C

| | REGISTERS |
|---|---|
| C0 | USE r1 FIELD OF REG R2 FOR LOW ORDER BITS OF LS ADDR. |
| C1 | USE X2 FIELD OF REG R2 FOR LOW ORDER BITS OF LS ADDR. |
| C2 | R1 |
| C3 | R2 |
| C4 | R3 |
| C5 | R4 |
| C6 | R5 |
| C7 | COND. CODE (SHARED) |
| C8 | (NOT USED) |
| C9 | LOW ORDER FIELD OF R2 |
| C10 | ALU COND. CODE |
| C11 | C AND D FIELDS OF MICRO INSTRUCTION REG. |
| C12 | r1 FIELD OF R2 |

MICRO INSTRUCTION & LOCAL STORE

SHARED LATCHES

MULTIPROCESSING COMPUTING SYSTEM WITH TASK ASSIGNMENT AT THE INSTRUCTION LEVEL

BACKGROUND OF THE INVENTION

As computer technology continues to become more and more sophisticated, continuous efforts are being made to increase the power of computing systems. Generally, this refers to speed with which a computer is able to perform instructions. One method in which the power or speed of computers is being increased is by the use of faster components, both in the memory area and in the computational and logic area. Increased used of integrated circuit techniques in the computer field is allowing great advances to be made in the areas of circuit miniaturization, switching speeds, etc. One additional way in which a computing system's ability to reduce the overall time in which a given complex job may be accomplished is to employ multiprocessing techniques. By this means, a job may be broken up into a series of smaller jobs and performed in parallel on a plurality of CPU's.

Computer systems with multiprocessor architecture offer certain advantages ovdr uniprocessor systems. A significant advantage is the increased availability such systems afford. Should one processor fail, the remaining ones can continue to provide some fraction of the original processing capacity. A further advantage is the computational flexibility multiprocessors provide. As stated previously, by adding one more CPU to a computer complex, one can add an increment of computing power while still retaining high availability.

Multiprocessing can be performed with different degrees of processor interaction. At the lowest degree of interaction, each processor handles a completely independent job stream, not sharing main storage, but sharing files with other processors. This is called multisystem operation. At a higher degree of interaction, a single job stream is assigned to the processors by a single executive system, but each CPU processes one job at a time. Storage is shared for the sake of leveling the demands upon storage space. Some executive functions must be provided to allocate CPU's and storage to jobs. The next higher degree of interaction in multiprocessing is multitasking, in which CPU's and other devices are allocated to individual tasks of the job stream by the executive system. IBM System/360 Time Sharing System, which is the time sharing operating system used on an IBM duplex model 360/67, is a good example of such a multitasking system. This type of multiprocessing has the advantage over systems with separate job streams of being able to allocate resources to tasks more efficiently. On the other hand, the overhead of the executive system can be exceedingly costly in terms of time, because the functions are more complicated, and they are invoked more frequently.

SUMMARY AND OBJECTS

It has now been found that a highly interactive multiprocessing system architecture may be provided which is capable of securing a large degree of processor interaction while executing a single instruction stream. The instruction stream is processed at the assembly or machine language (assembler language) level, wherein it is not necessary for the programmer or the supervisory system to in any way indicate or assign jobs to the various processors. The present system has the advantage over more conventional multi-tasking systems of requiring no executive program to allocate CPU resources, since it is anticipated that the entire CPU allocation function will be performed by a combination of hardware and microprogramming techniques. This approach also relieves the application programmer of dividing his program into tasks and providing the attendant interlocks in soft-ware. Most of the drawbacks of conventional multi-tasking are eliminated by the present architecture, at the cost of some hardware interlocks. A further feature of the present multiprocessor system is the increased availability of the system; i.e., the architecture is such that when one computer fails for some reason, the other computers will continue working on the remaining job stream without even being aware that the other CPU is no longer functioning.

It is accordingly a primary object of the present invention to provide a multiprocessing system which accomplishes job assignment at the instruction level.

It is yet another object of the present invention to provide such a system having the characteristic of high availability in that when one CPU ceases to function, the other will continue functioning with a minimum of degradation of performance.

It is a still further object of the invention to provide such a system where the primary additional costs of performing multiprocessing over the cost of a uniprocessor are additional CPU's and a plurality of special hardware interlocks.

It is yet another object to provide such a system having automatic controls which prevent one computer from starting on an activity before a preceding activity has been completed on which the latter activity is dependent.

It is yet another object to provide such a system having automatic controls which prevent all other possible erroneous operations that might otherwise occur as a result of not executing instructions in strictly sequential order.

It is yet another object of the invention to provide such a system wherein the plurality of processors share main storage, micro-instruction storage and local storage as well as a number of hardware interlocks.

Other objects, features and advantages of the invention will be apparent from the following more particular description of a preferred embodiment of the invention as illustrated in the accompanying drawings.

DESCRIPTION OF THE DRAWINGS

FIG. 3A is a list of typical micro-instructions which would be utilized, and indicates the functions performed by each one.

FIG. 3B shows a list of coded register and latch designations which are utilized together with certain micro-instructions to perform various operations within the present system.

FIG. 3C comprises a list of coded register designations which like the list of FIG. 3B is utilized with certain of the micro-instructions.

DESCRIPTION OF THE DISCLOSED EMBODIMENT

Figure 1:
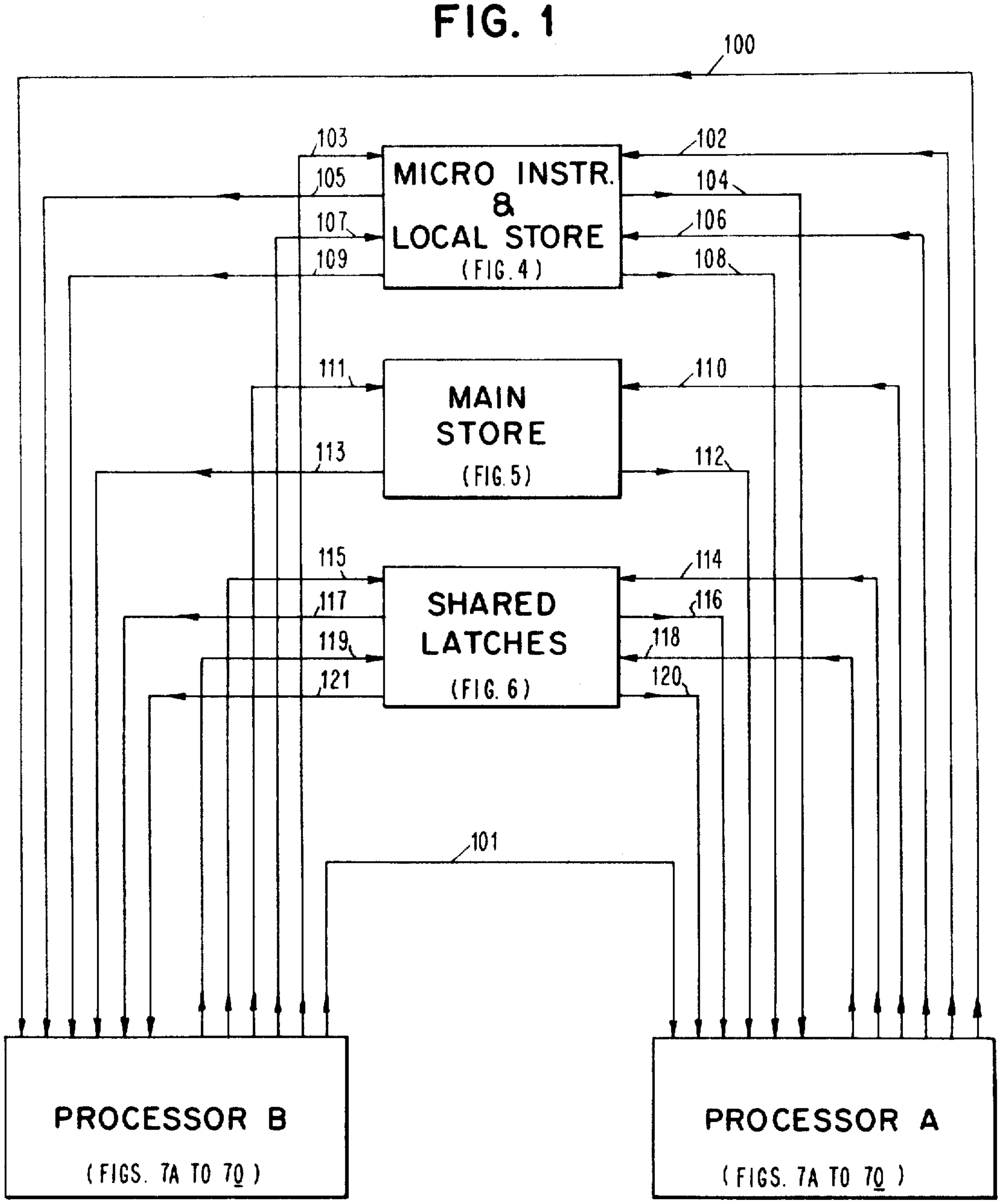
FIG. 1 comprises a functional block diagram of a multiprocessor computing system constructed in accordance with the teachings of the present invention.

The objects of the present invention are accomplished in general by a multi-processor computing system comprising a plurality of separate processors, each processor having a separate control means for providing sequences of instructions to the processor for execution. Each control means also includes means for sharing a main storage, a local storage, and a plurality of interlocks for preventing unwanted interaction between said plurality of processors. Each said control means further includes means for sharing a micro-instruction store. Said micro-instruction store containing the actual control sequences for controlling the sequences of operations of each of said plurality of processors. Further means are included in this control means for accessing successive machine instructions provided to the multi-processing system and stored in main storage, the machine instructions being written in the machine language of the desired emulated processor. Means including said micro-instruction store and appropriate decoders therefor are provided for converting said machine language instructions into a micro-instruction sequence for executing same in one of the plurality of processors.

According to further features of the invention means are provided for determining if all or part of an accessed machine language instruction can be performed immediately or must await the performance of some part of some previous instruction.

According to still another feature of the present embodiment, the interlocks are embodied in hardware latches whereby before certain micro-instruction operations may be performed by a processor, it must be determined whether or not another processor is performing a related operation. Further means are provided for certain interlock testing situations wherein the interlock is both tested and set in a single processor cycle to prevent a race condition existing wherein two or more processors might 1ry to make the same test substantially concurrently.

According to the presently disclosed system, a conventional sequence of machine language instructions may be submitted to the system and stored in main storage. Alternate processors will access successive instructions. Thus, a single instruction stream is capable of being executed in a highly efficient and parallel manner. In the event that a subsequent instruction requires the result of a previous instruction, adequate controls are provided for preventing the subsequent processor from performing the operation until all required operations have been completed by the previous processor.

According to the presently disclosed system, one processor can access a number of successive machine language instructions when all the other processors remain actively executing the instructions they have previously accessed.

A significant feature of the present invention is that the multi-processing or parallelism is done at the level of extremely small tasks, i.e., individual machine instructions. It is not necessary for a programmer to in any way know that his program is to be run upon a multi-processing system, nor is it necessary for any special compilers or assemblers to make special allocations of processor tasks to significant program sequences.

In the presently disclosed embodiment, two processors have been shown, processor A and processor B. This is clearly shown in FIG. 1. It will be apparent that both the processors share the blocks entitled "Micro-instruction and Local Store", "Main Store", and "Shared Latches." The micro-instruction store and local store are both extremely high speed memories and might typically have cycle times approximately one-half the cycle time of the CPU. Therefore, two local store and two micro-instruction store accesses could be made in the time of one processor cycle. Thus, in the present embodiment, the machine cycles of the two processors are staggered by one-half of a processor cycle. The micro-instruction store is accessed once every machine cycle for each processor. The local store can be accessed once every machine cycle for each processor. In this way, the bandwidth of both the local and instruction store is fully used. Also, each CPU is still able to perform essentially at its own maximum rate without awaiting access cycles in said micro-instruction and local store units. This sharing of micro-instruction store and local instruction store permits adding substantial processing power and availability at the cost of a single added CPU. As is apparent, additional hardware is also necessary for interlocks. Also, each CPU has its own area in local store to use for "scratch-pad" storage. Also, the micro-instruction store is increased somewhat in the present embodiment over what would be necessary if this were a single processor micro-instruction controlled machine, in order to take care of some of the various testing, setting, and other interlocking routines.

Figure 4:
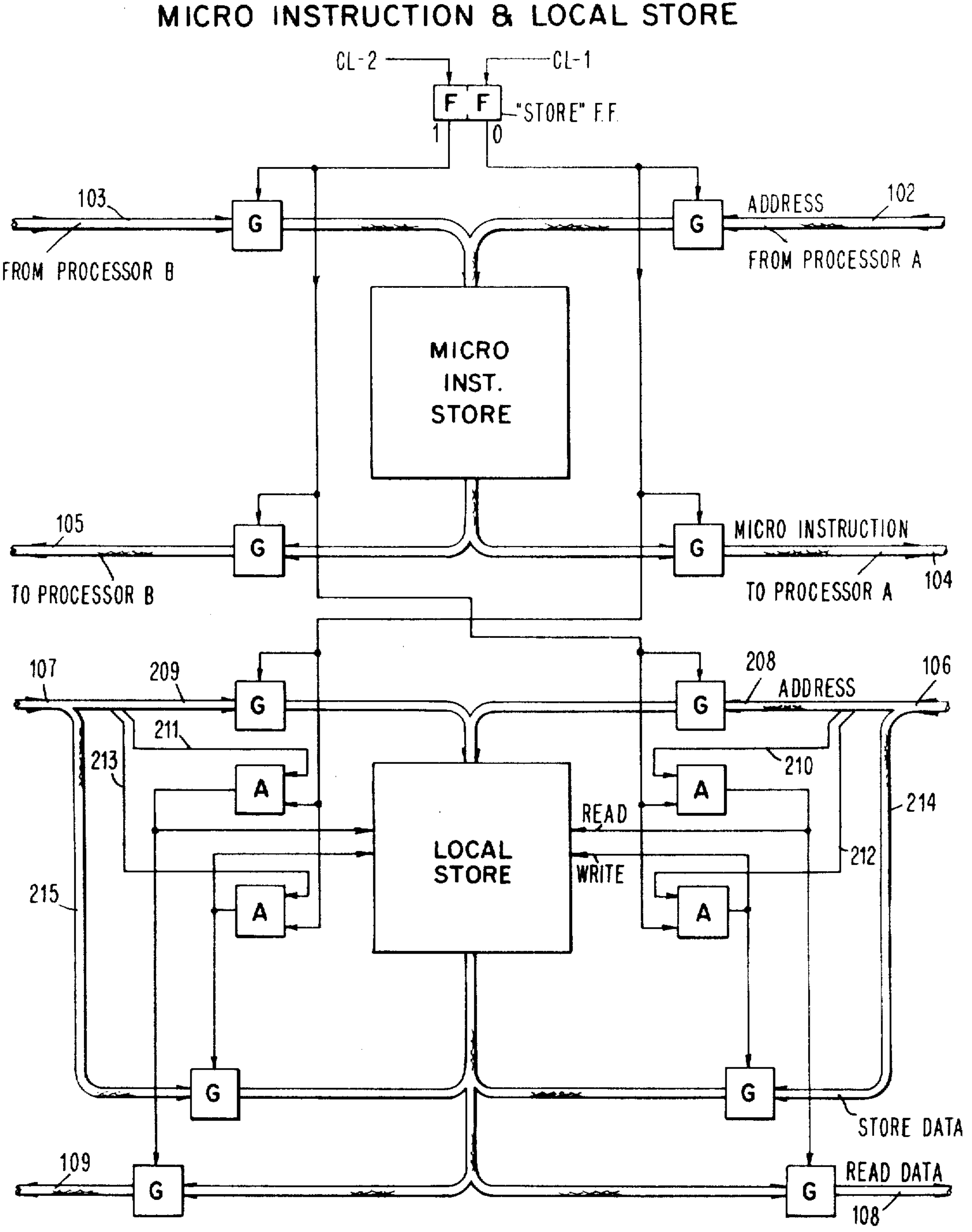
FIG. 4 comprises a combination functional and logical schematic of the micro-instruction store and the local store blocks illustrated in FIG. 1 indicating the more significant functional units and control interlocks therefor.
Figure 5:
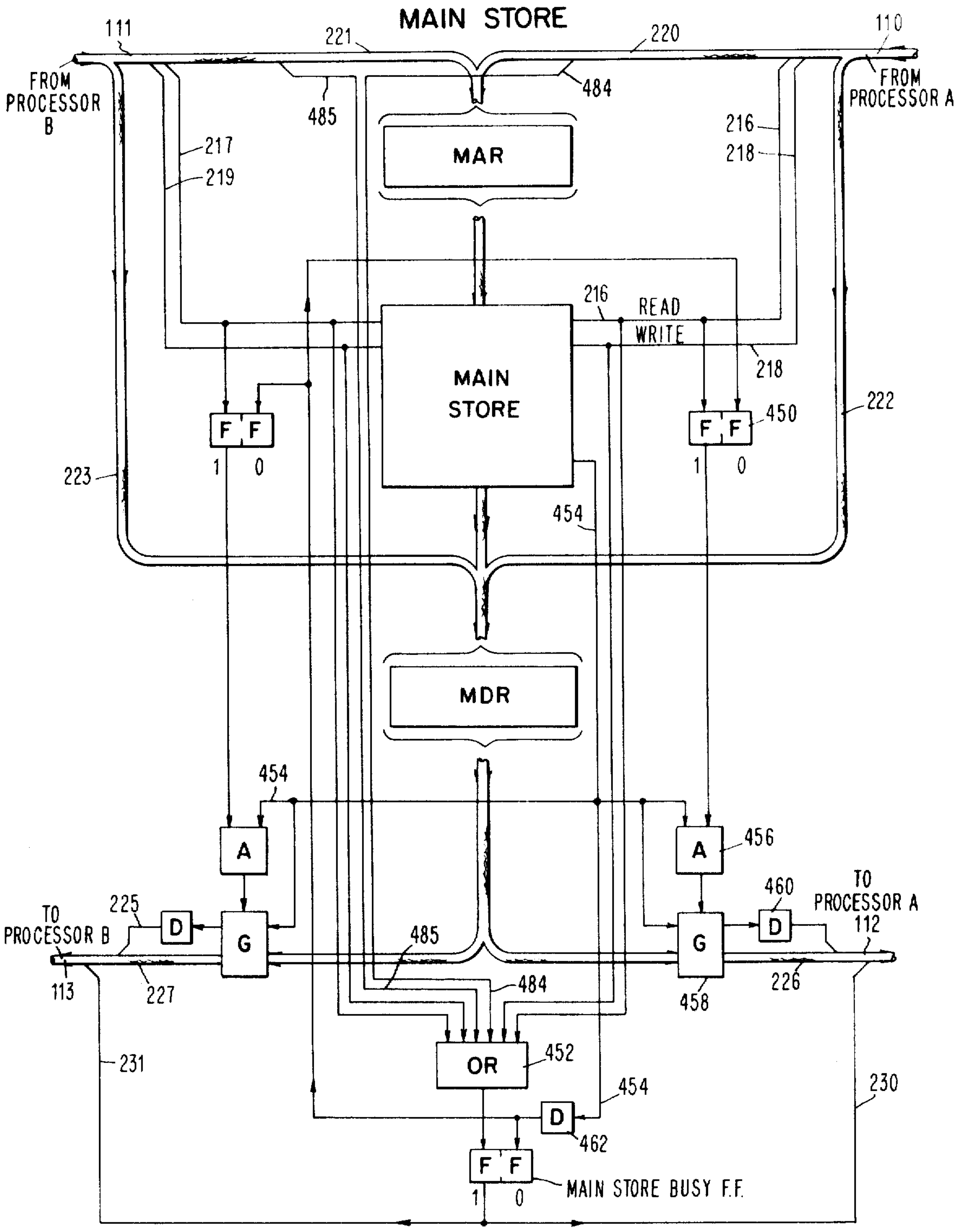
FIG. 5 comprises a combination functional block and logical schematic diagram of the main store which is shared by the two processors of the present embodiment indicating the more significant functional units and hardware interlocks provided.
Figure 6:
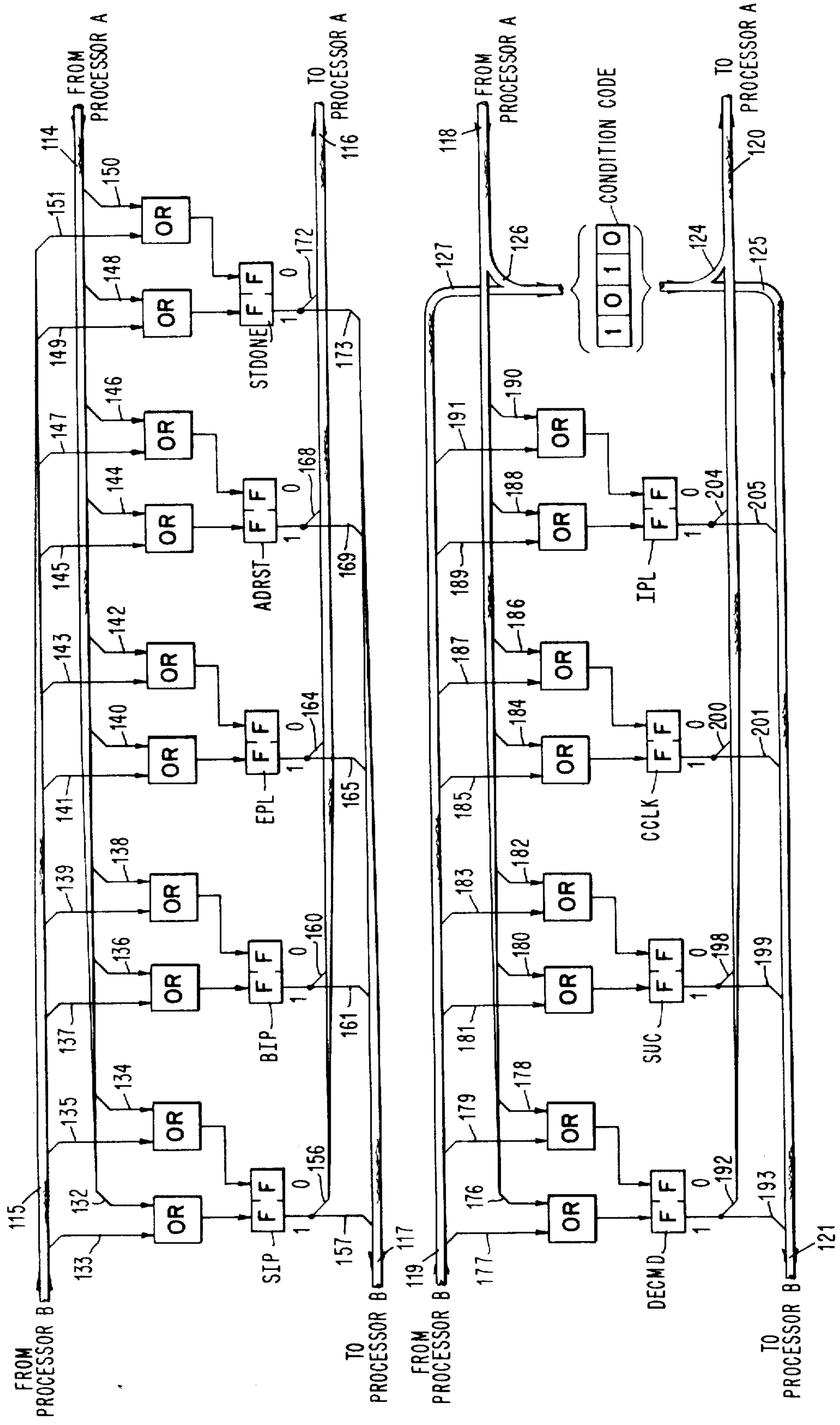
FIG. 6 comprises a logical schematic diagram illustrating the shared latches utilized in the present invention and also shown in block form on FIG. 1.
Figures 7, 7A:
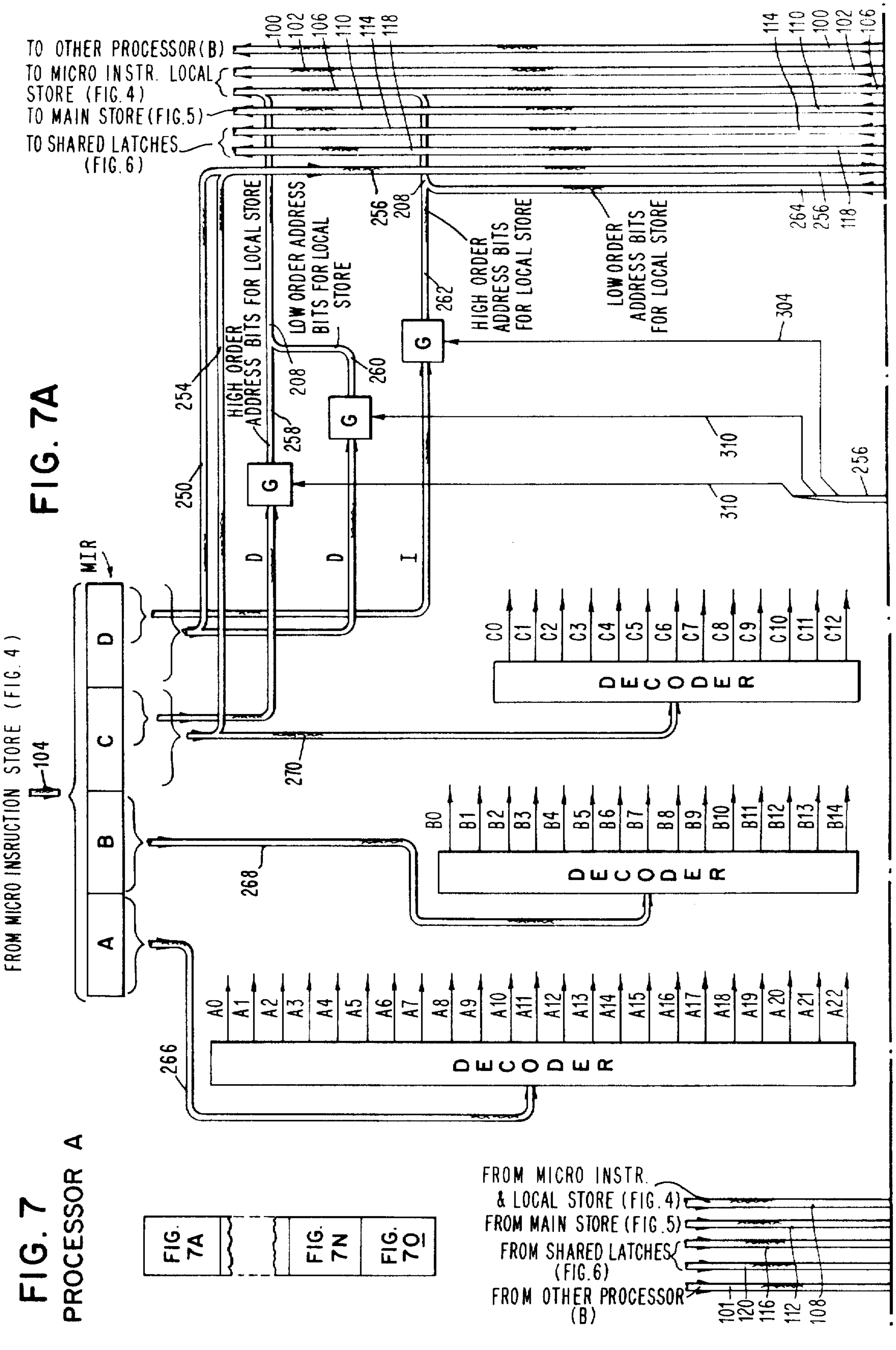
FIG. 7 comprises an organizational diagram for FIGS. 7A–7O.
FIGS. 7A–7O comprise a logical schematic diagram of the significant control circuitry located within each of the processors of the present system, it being noted that lines in interconnecting cables shown in these figures are identical where possible to those on FIG. 1, it being more particularly noted that the designation of this figure

Before proceeding further with the description of the present embodiment, a brief comment relative to the designation of the processors A and B is in order. It will be apparent from the subsequent description that FIGS. 4, 5 and 6 are logical schematic representations of the micro-instruction store and local store, the main store, and the shared latches. FIGS. 7A through 7O constitute detailed logical schematic diagrams of the individual control elements for either one of the processors A or B. Therefore, the terminology in these figures is set forth as "this processor" or the "other processor." For convenience of reference, however, FIGS. 7A through 7O assume that this control element is for processor A. Since even numbers are used to refer to processor A and odd numbers are used to refer to processor B, the majority of the cables in FIGS. 7A–7O are labeled with even numbers.

The numbers along either side of FIGS. 7A through 7O, are for cables that may be directly seen on the overall block diagram of FIG. 1 and also on the individual element diagram of FIGS. 4, 5 and 6. It is also noted that certain of the cables passing between the two processors, such as 100 and 101 are also shown on the drawings. In certain portions of the specification, where appropriate, the terminology "processor A" and "processor B" is utilized, and in other places the operation of a particular control will refer to "this processor" or "the other processor," it being understood that the control means for the two processors are identical.

Thus, for example, in the description of the flow charts which are contained in Tables I through V, the terminology "this processor" and the "other processor" is more appropriate, as no specific hardware is being referenced, and at any given point in the reference to these flow charts, any direct interaction between the two processors is better designated this way.

Returning now to the description of the present embodiment, it should be apparent that the present machine is essentially a micro-program controlled machine where the actual processors perform their various operations under direct control of micro-program sequences fetched from the micro-instruction memory. Each micro-instruction causes only one operation to be performed. For purpose of the present embodiment, it is assumed that for the computer being emulated:

1. All data words and all machine language instructions have the same number of bits, and this number of bits is the same as the number of bits of a word of main storage, a word of local storage, and registers R1 to R5 and the ALU inputs and output of the processors;
2. There are General Registers and Floating Point registers, used similarly to the way they are used in IBM System/360 computers;
3. The machine language instructions have four fields, designated
   a. OP-code, used to specify the machine instruction to be executed,
   b. *rl*, used to specify a General Register or Floating Point register that contains an operand,
   c. *x*2, used to specify a General Register that contains an index number,
   d. B2, used for a base number;
4. For machine instructions that require operands from main storage, the address in storage is specified by the sum of the index number and the base number;
5. A condition code register of 2 bits is required;
6. Some machine language instructions cause the condition code register to be set according to the result of the specified operation;
7. Normally, machine language instructions are executed one after the other as they are located in main storage, except when a branching instruction directs that the next machine language instruction be fetched from elsewhere than the next sequential location in main storage;
8. For certain machine language branching instructions, the "branch" is taken or not, depending upon the contents of the condition code register and the contents of the R1 field, as it is done in IBM System/360.

Figure 7B:
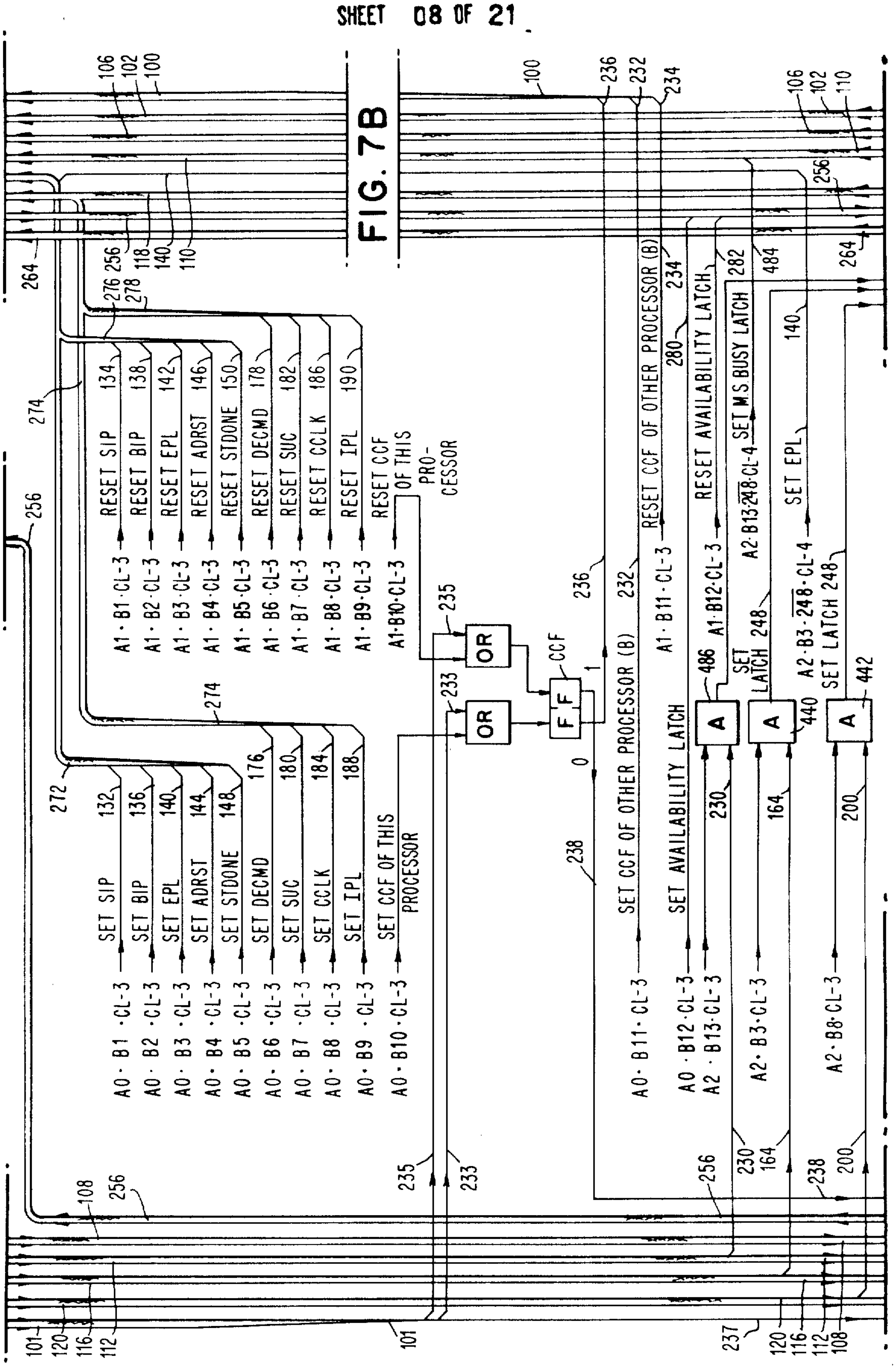
Figure 7C:
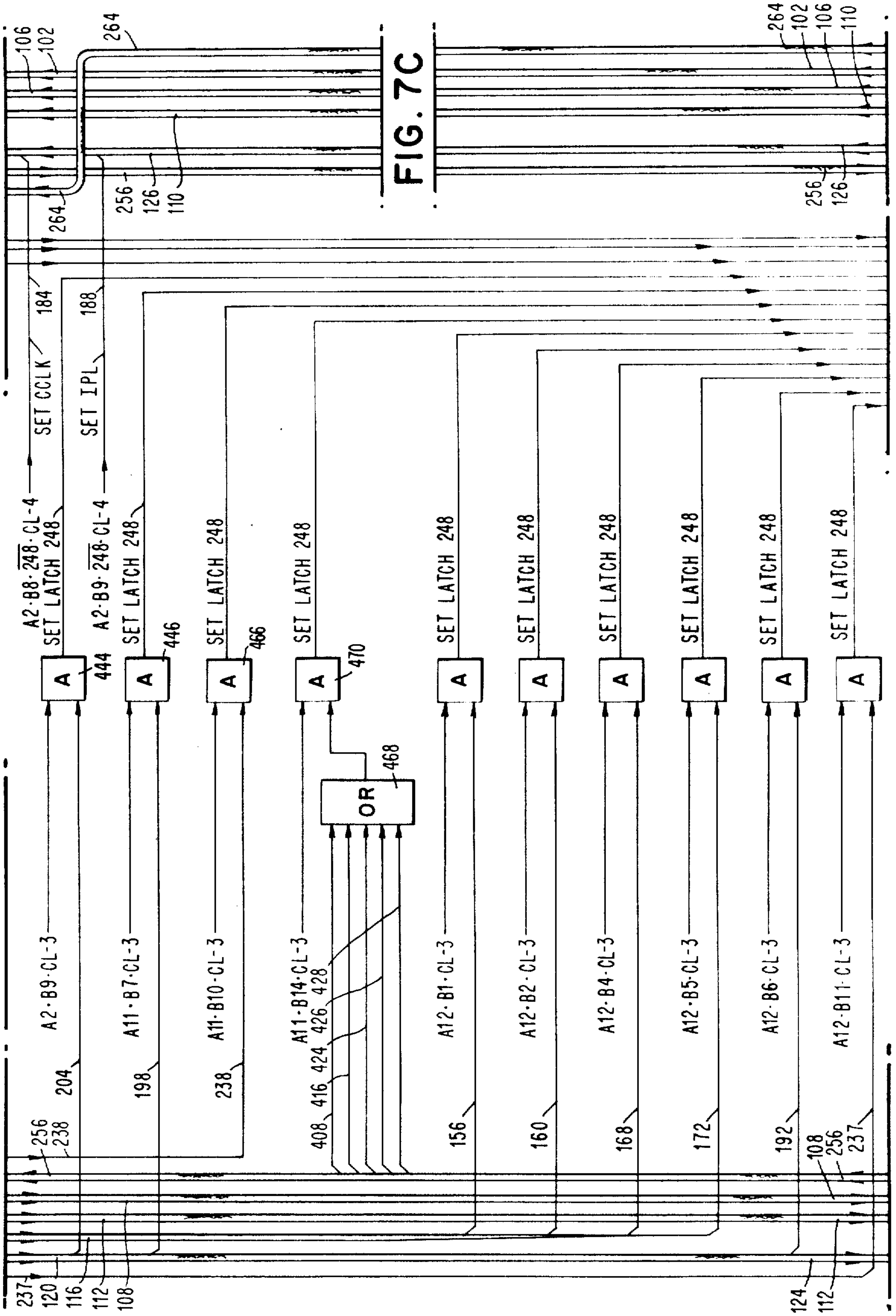
Figure 7D:
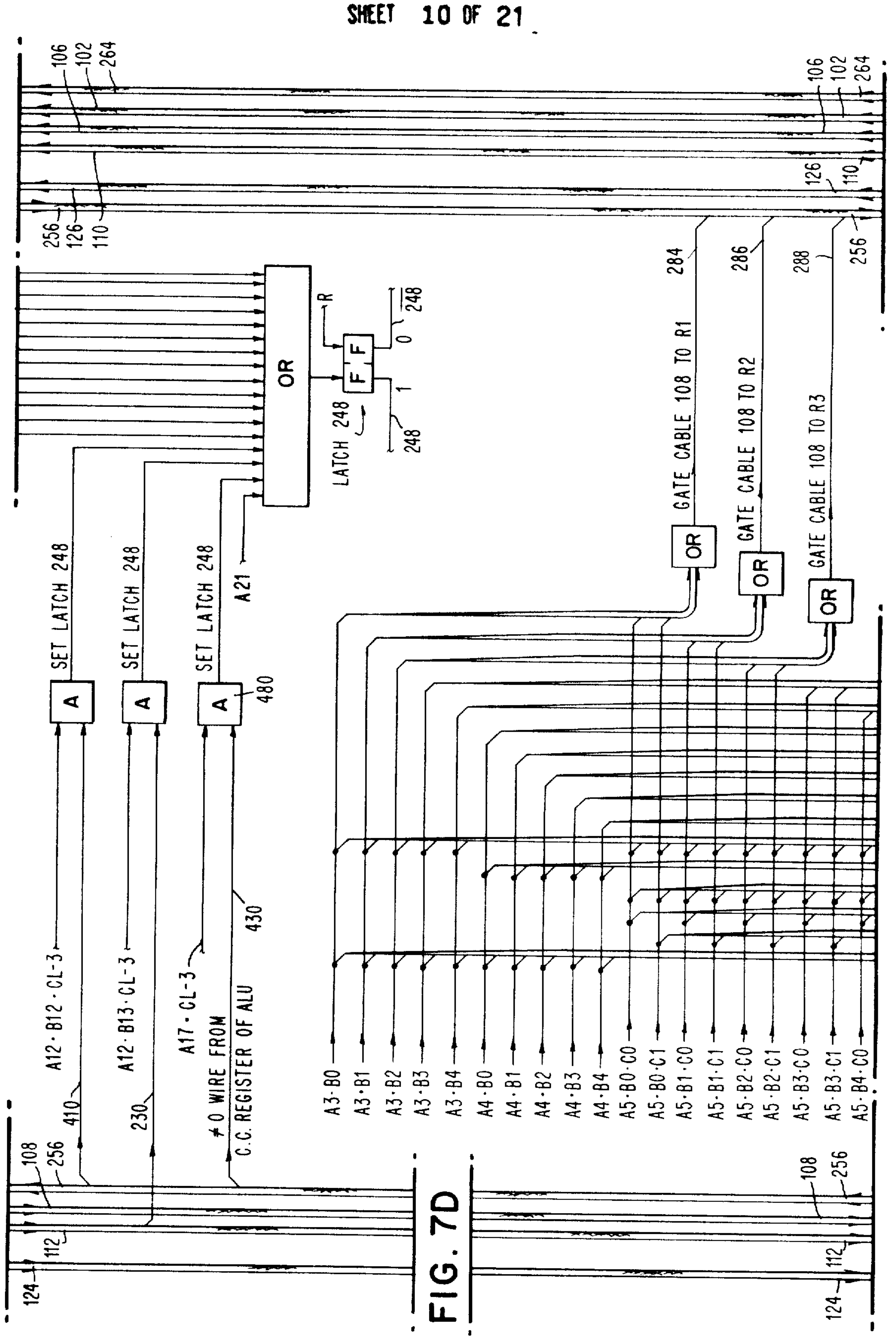
Figure 7E:
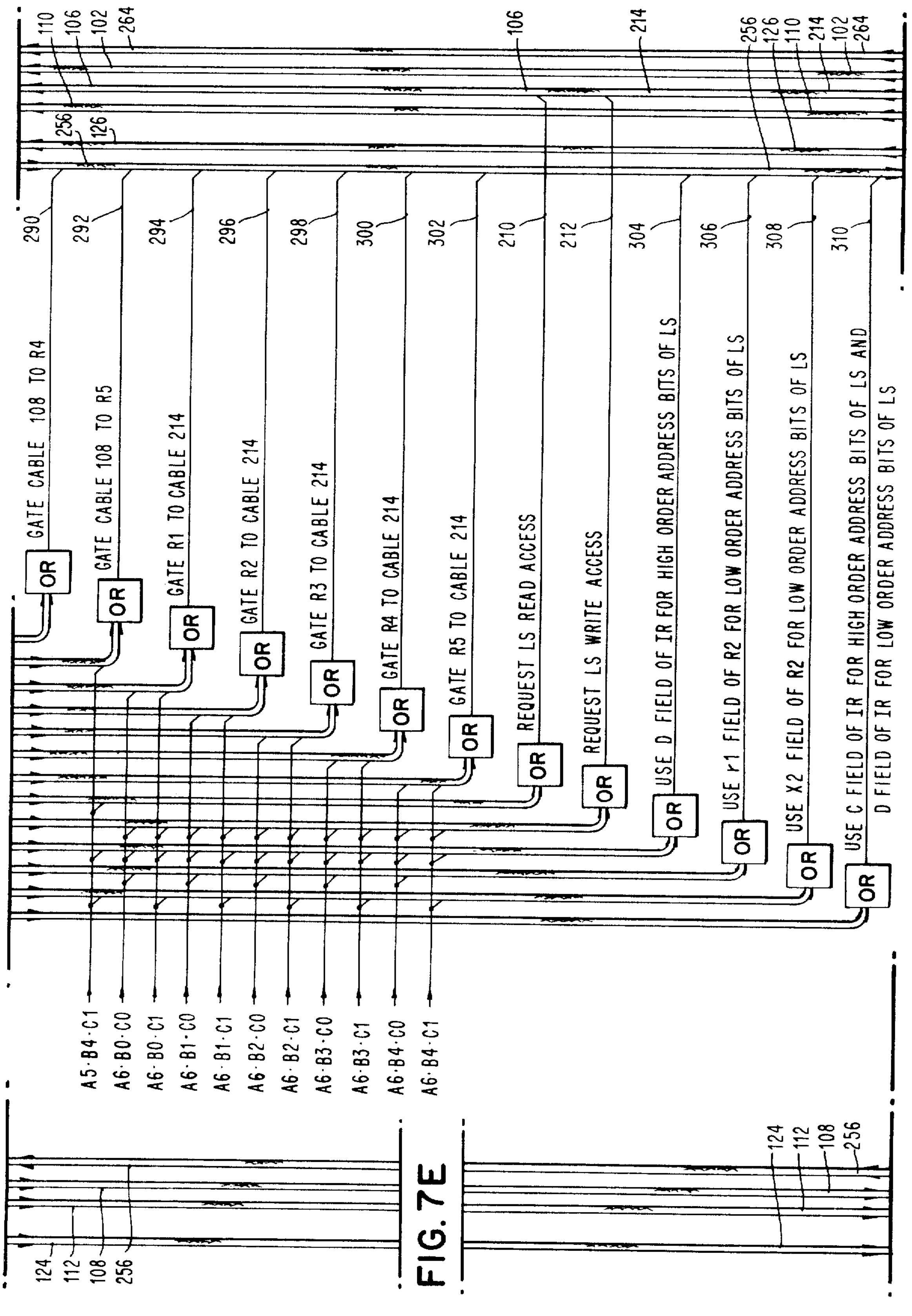
Figure 7F:
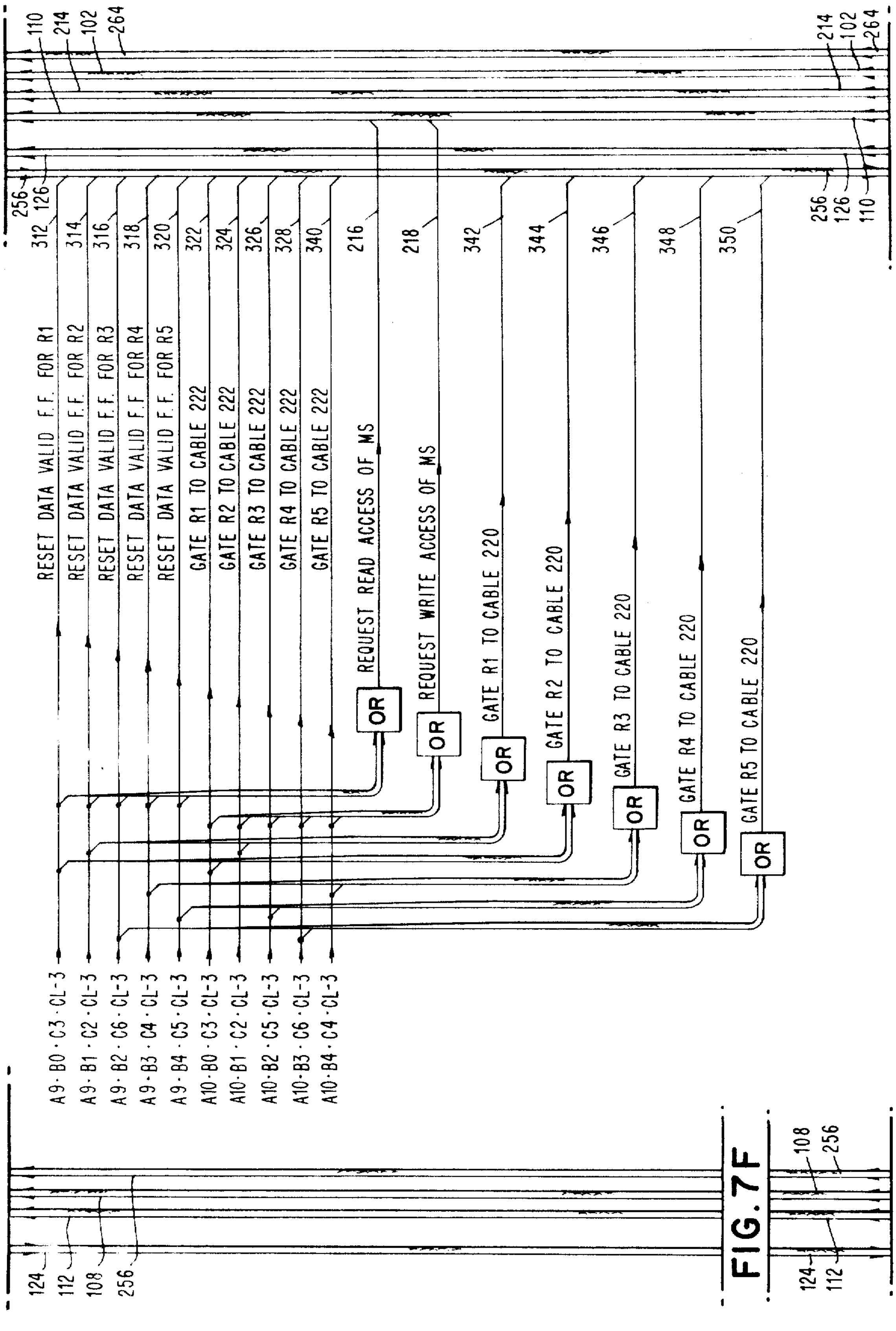
Figure 7G:
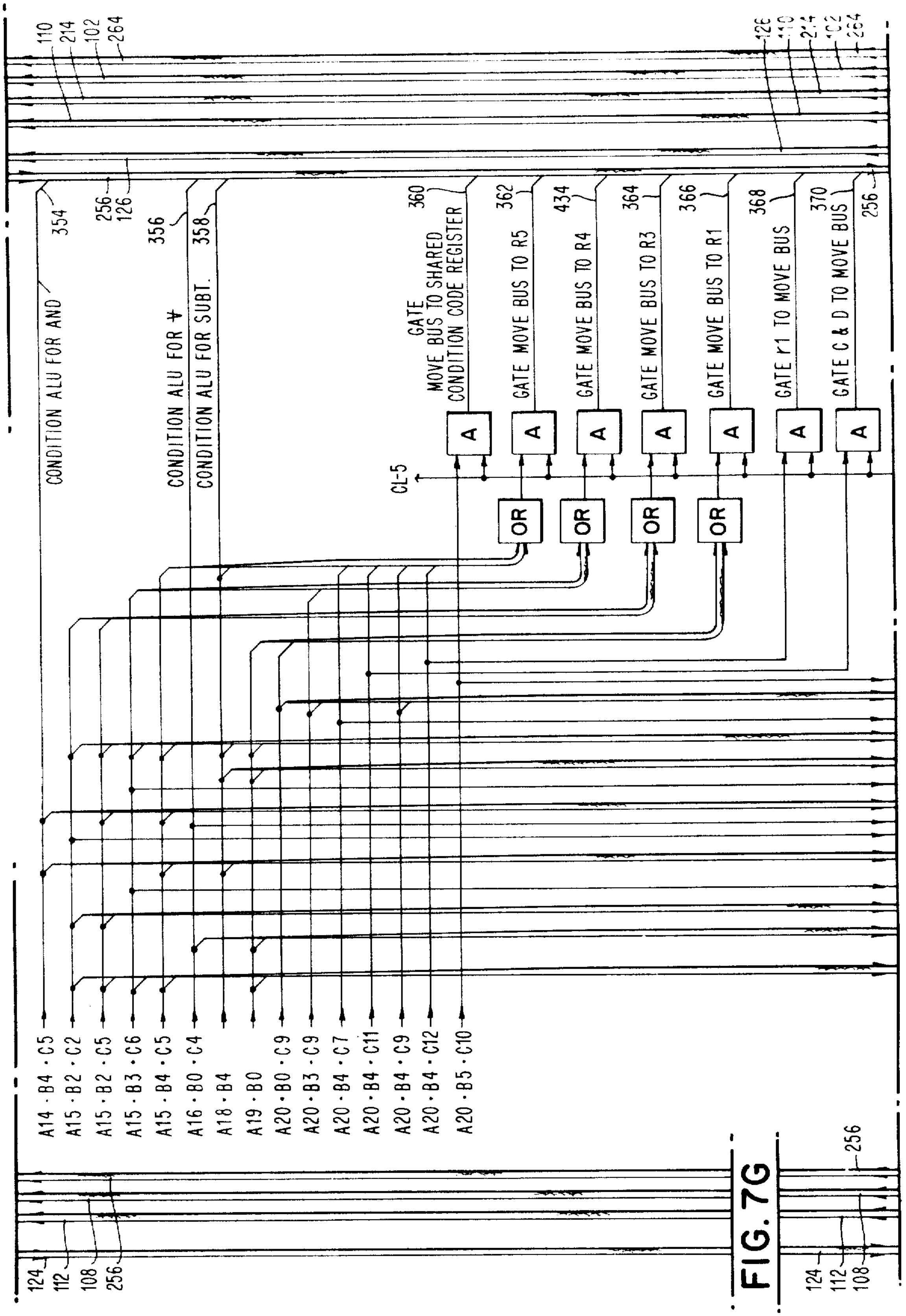
Figure 7H:
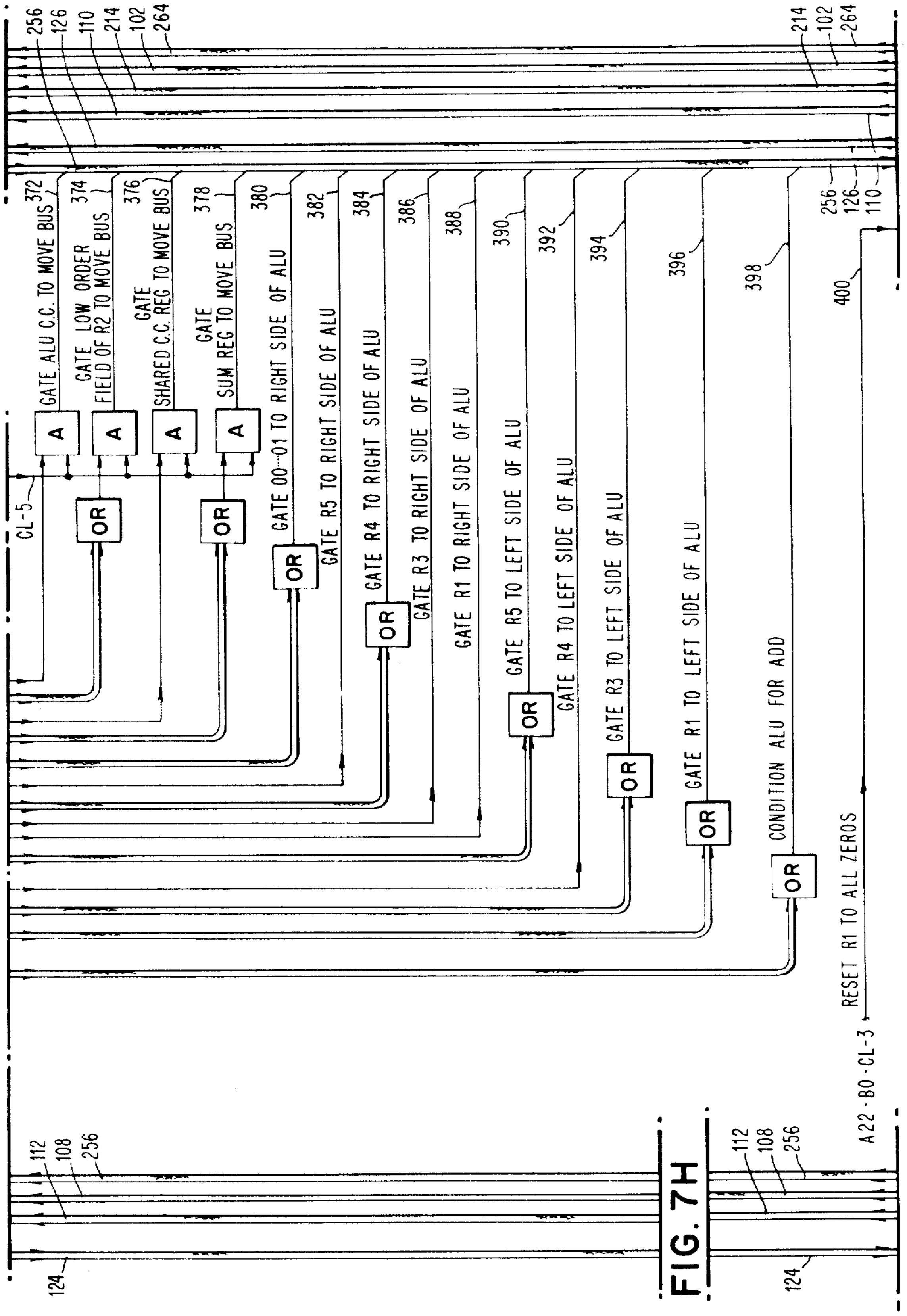
Figure 7I:
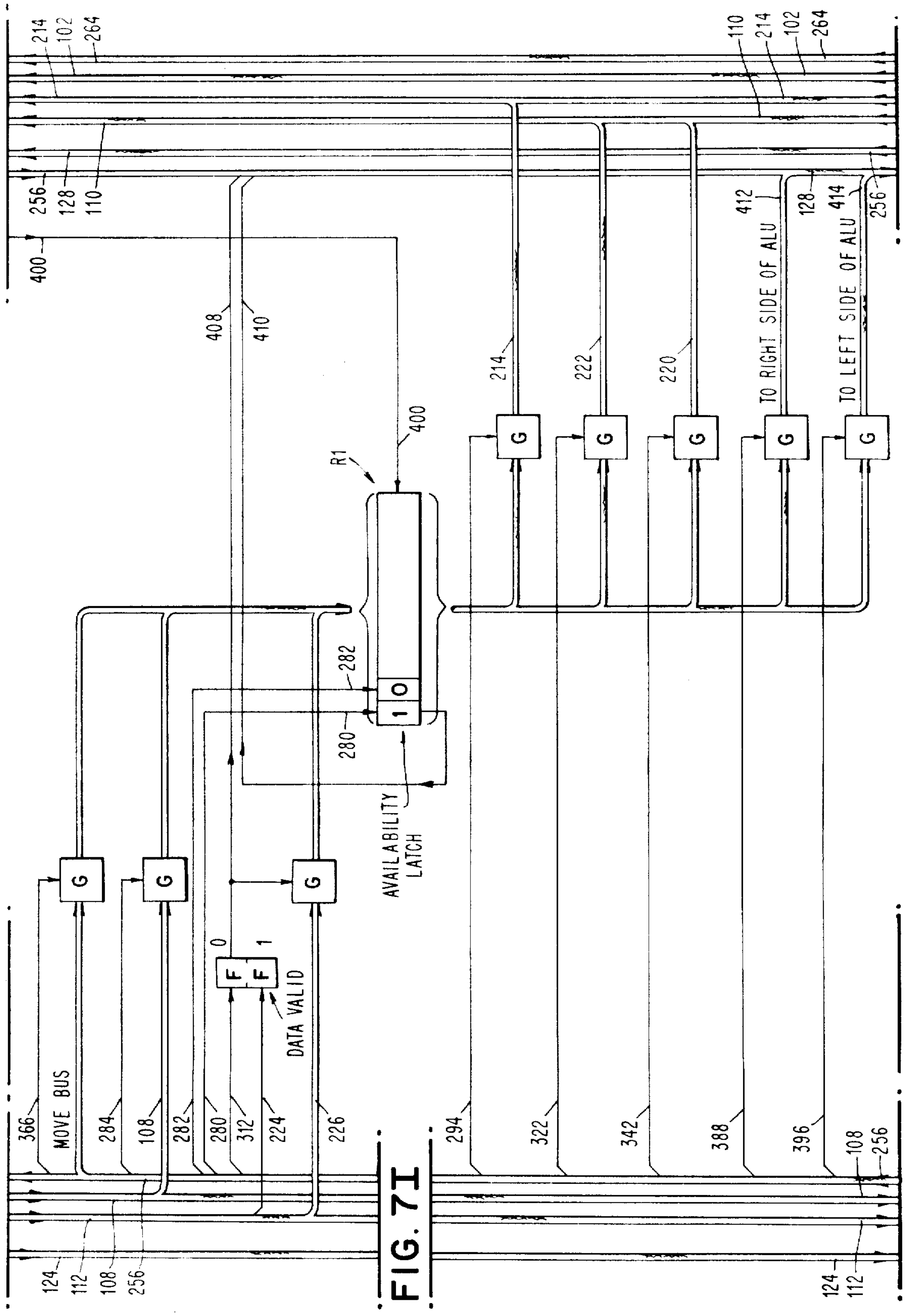
Figure 7J:
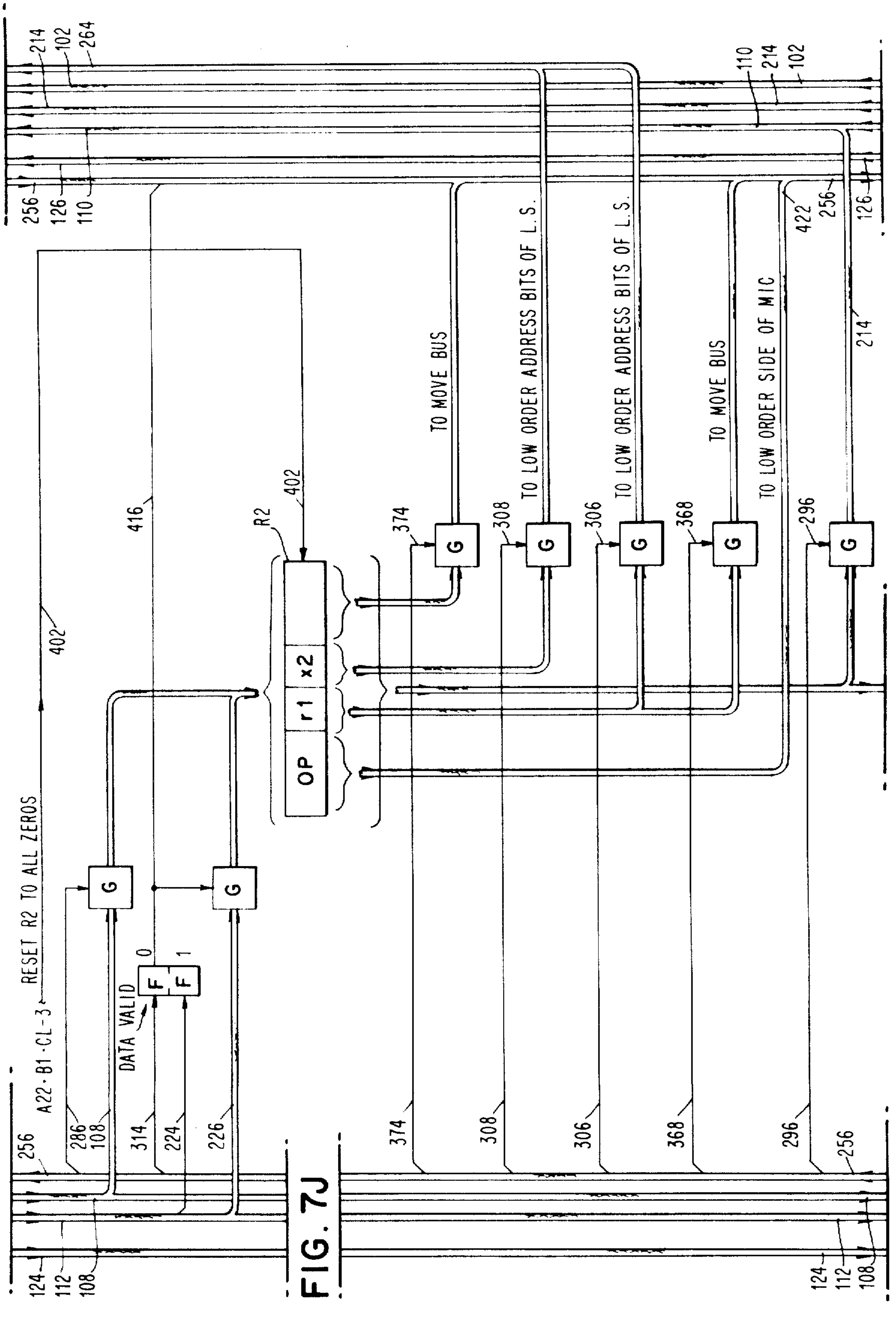

During the operation of the system, described sequentially, each machine language instruction is fetched from main storage into one of the processors and placed in the register R2 on FIG. 7J, wherein the operation code field causes a particular sequence of micro-instructions to be accessed by one of the processors. The branching operation to the first micro-instruction of the new sequence is done essentially by utilizing the operation code of the machine language instruction as part of an address in the micro-instruction store. It is apparent that there must be as many microprogram sequences as there are machine language OP-codes that would be encountered in such a system. The micro-instruction sequences, as will be apparent, could either be a single micro-instruction or, as is more likely the case, a series of micro-instructions. This is especially true since in the present multi-processing system, the various interlocks to prevent one processor from interfering with another in certain operations, must be set (and in most cases tested). As will be apparent from the subsequent more detailed description both of the flow charts and the embodiment, the more important interlocking operations concern the prevention of more than one processor trying to access the various shared elements of the system at the same time. Other more conventional interlocks are also present. In the event that a series of machine language instructions (not micro-instructions) is being performed, and the oeperation of a subsequent instruction requires the result of a prior instruction, interlocks must be provided which prevent a processor from starting to process an instruction before the desired result of a previous instruction has been obtained. Also, interlocks must be provided for the situation where machine language branches are being executed and various tests of the branch conditions must be made at some point before the specified given branch can be finally taken. However, as will be apparent this system allows a subsequent processor to proceed at least part-way along the branch before the condition test must be made.

Figure 2:
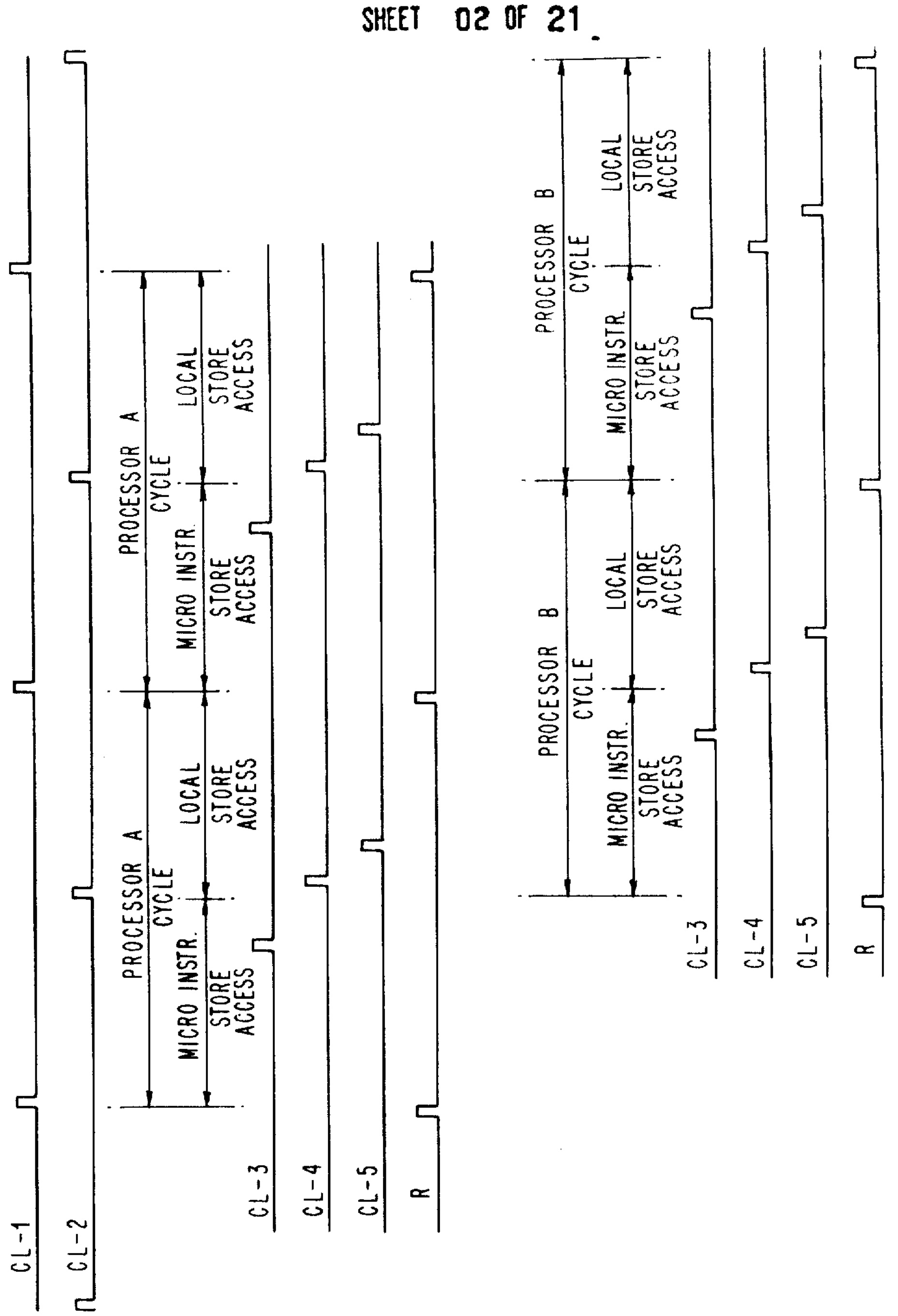
FIG. 2 comprises a timing chart for the computer system of the present invention illustrated in FIG. 1 showing the significant clock signals utilized in the system.

Referring briefly to FIG. 2, this comprises a timing chart for the presently disclosed system. Cycles of the two processors are overlapped. At the top of FIG. 2, the clock pulses entitled "CL-1" and "CL-2" times the overlapping of the two processors. These clock pulses control the starting of the Processors A and B operating cycles, respectively. Each processor cycle is divided into two halves. The first half is the micro-instruction store access. The second half of the processor cycle can be a local store access, if desired. On FIG. 2 there are also two separate sets of clock pulses entitled "CL-3, CL-4, CL-5 AND R." As will be apparent one set of these clock pulses is provided for each processor. It will be noted that these two sets of clock pulses are staggered in order to accommodate the staggered cycles of the two processors. FIGS. 3A through 3C are also described subsequently, it being noted that the A field of each micro-instruction contains information which is actually the micro-instruction operation code which designates just what the operation to be preformed is. The B and C fields of the micro-instruction in effect contain register and latch designations for the actual micro-instruction designated in the associated A field. The various micro-instructions are gated out of the micro-instruction store and loaded into the micro-instruction register MIR shown at the top of FIG. 7A, where they are appropriately decoded to bring up certain of the output lines from the decoders.

On the timing charts, each micro-instruction in the sequences of micro-instructions is given both in terms of a phrase in English or symbols that describes the operation performed by the micro-instruction, and in terms of logical combinations of the outputs of the A, B and C decoders of FIG. 7A. These logical combinations are simple AND functions of the outputs of the decoders. The generation of these AND functions is not shown on the figures. These logical combinations correspond to input lines to the logic of FIGS. 7A–7O. In some cases these logical combinations are combined with clock signals by a logical AND function. The AND logic is not shown on the figures.

Referring briefly to FIG. 4, there is an illustration of the micro-instruction store and the local store and certain gating circuits and interlocks that are necessary with each of these stores. For example, on the figure when the CL-1 pulse sets the "Store Flip-Flop" to its "0" state, cable 102 is gated to furnish the address to the micro-instruction store, and cable 104 is gated so as to send the micro-instruction back to processor A. When the pulse CL-2 sets the "store" flip-flop to its "1" state, cables 103 and 105, which are associated with processor B, are connected to the micro-instruction store. Again on the figure it will be noted that when the "store" flip-flop is in its "0" state, processor B is connected to the local store. Thus, during the time that the processor A is fetching a micro-instruction from the micro-instruction store, processor B can, if necessary, use the local store. The reverse is true when the "store" flip-flop is in its "1" state.

FIG. 5 is a diagram of the main store and the associated circuitry used by it and the two processors. The main store is slower than either the micro-instruction store or the local store. It would probably take four or five processor cycles to complete its cycle. For this reason a "main store busy flip-flop" is provided at the bottom of the figures which is set to "1" whenever the main store is busy. When a processor needs a main store access, it must test this flip-flop and wait until the flip-flop becomes set to "0" when the main store is not busy.

FIG. 6 shows latches which are shared by both processors. At the lower-right corner of the figure is a two-bit "Condition Code" register which is also shared by both processors. This register facilitates emulation of computers with two-bit condition codes, such as the computer described above that is emulated in this embodiment and IBM System/360. The use of the condition code insofar as the description of the present embodiment is coccerned will be set forth subsequently. As is well known, the condition code is utilized in a number of conventional machine languages to specify various logical conditions that result from machine language operations. The conditions are tested and utilized in branching and certain other logical operations.

The purpose and operation of these latches will be set forth specifically insofar as their operation is concerned in the specific description of the embodiment. Their functional description is are set forth in the general description of the shared latches set forth subsequently in the specification, which includes a description of Tables II and III. The latch designations and their functions are very clearly set forth in these tables.

There will now follow a general description of the operation of the shared latches and also a general description of the flowcharts with reference to Tables 1 through 5, wherein the overall operating sequences of the disclosed embodiment are clearly set forth and described. It is believed that the subsequent general descriptions, together with the specific detailed description of the actual operation of the hardware embodiment as exemplified by FIGS. 7A – 7O will make the operation of the presently disclosed system abundantly clear. For example, virtually every input condition specified by the micro-instruction inputs listed on FIGS. 7B – 7G is described in considerable detail. For the sequences of the particular operation, reference should be made to a particular flowchart, assuming that a particular instruction has been accessed and placed in the register R2 and has caused a particular microprogram sequence to be entered.

General Description of Operation of Most Significant Interlocks (Latches)

The present system has been embodied with simple interlocks. The major necessary interlocks are those for register usage, branching, condition code setting, and storage in areas used by subsequent instructions. Although the flowcharts include logic necessary to prevent erroneous operation of the specific computer emulated in this embodiment, similar logic would be necessary for any other computer emulated by this system.

The interlocks for register usage prohibit a subsequent instruction from accessing data from or placing data in a register before the precedent instruction has finished with that register. This is done by creating a binary usage flag for each General Register and Floating Point Register. Each flag is implemented as a bit in a word of local storage that can be set by both processors and whose state can be tested by both processors. The state "one" indicates that data in the corresponding register may be undergoing modification. At a point during execution of a machine language instruction, register usage flags are examined. When the flags for the registers containing the source data for the instruction are zero, the data are extracted from the appropriate registers. The destination register(s) flag is set to one once it is detected to be zero. The other processor is not permitted to proceed into the execution phase of the next instruction until these operations have been performed. All machine language instructions, as is well known, are performed in two phases. The first called the instruction-fetch phase, involves fetching the instruction from main storage, updating the instruction counter, and testing for interlock conditions. The second phase, called the execution phase, involves fetching operands from main and local storages and performing the operation, such as addition or multiplication. When the result of the instruction is finally placed in the destination register(s), the flag(s) of the destination register(s) is (are) set to zero. One possible erroneous operation prevented by this interlock would occur when processor A executes MD 0, 2 (perform floating point multiplication of register 0 by register 2 and put result in register 0) followed by processor B executing LDR 4, 0 (place contents of register 0 in register 4). The relative times for execution of these instructions are such that without an interlock processor B would move some the old data from register 0 to 4, rather than the new data produced by the preceding multiply instruction. A detailed example of the register usage interlock is set forth subsequently.

The Condition Code (CC) setting interlock is relatively complex.

Two interlock flags are provided, one corresponding to each processor. When the Condition Code Flag (CCF) for a processor is in its "1" state, it indicates that the processor is executing a machine language instruction that sets the CC and that the CC setting must be performed. The CCF being zero indicates that either the instruction being executed does not affect the CC or that a subsequent instruction executed by the other processor has modified or will modify the CC. Tests, settings, and resettins of the CCFs occur in several places in the micro-code. First of all, when a processor begins to execute an instruction that affects the CC, it must set its own CCF to "1" and reset the other processor's flag to "0". Only then is the other processor permitted to proceed into the execution phase of a subsequent instruction. When it is ready to modify the CC, a processor must test its own CCF; only if the flag is set to the "1" state will the processor modify the CC and then reset its own flag. A processor executing a conditional branch instruction must test the CCF of the other processor and proceed only if it is zero; a flag set to the "1" state indicates a changing CC.

The interlock logic is designed to operate properly even under adverse timing situations. One such adverse situation occurs when the normal micro-instruction sequencing of a processor is inihibited so that the processor can perform a task of high priority, such as handling input-output operations. This type of temporary inhibition of normal sequencing is called a "trap." Although trap-handling logic is not illustrated in the embodiment, the interlock logic takes into account the possibility of the occurrence of traps at any time.

Because of the possible occurrences of traps, the relative timing of the operations related to the CCF is unpredictable. Consequently, a lock is provided to prevent two CPUs from testing or modifying a flag simultaneously. The lock is designated "CCLK" in FIG. 6.

Conditional branch instructions require interlocks, because the processor executing the subsequent instruction cannot know from where the instruction is to be fetched until the decision is made whether or not to take the branch. Branch instructions are micro-coded so that the instruction fetch for the next instruction can proceed immediately and that execution time will be less when the branch is taken than when the branch is not taken. This is achieved by having the processor executing the subsequent instruction fetch it from the branch-to address (the address specified in the branch instruction). This is done simultaneously with the execution of the branch instruction. Before a processor executing a branch-type instruction permits the other processor to fetch the subsequent instruction, it calculates the address to which the branch may take place and places it in a Local Storage location. Then it sets a flag (designated "BIP" in FIG. 6) that indicates a branch is in progress and releases the other processor to fetch the subsequent instruction. The other processor, detecting the flag indicating a branch is in progress, fetches the instruction at the branch-to address. It then waits until the processor executing the branch determines whether or not the branch should be taken. This information is conveyed by other flags ("DECMD" and "SUC" in FIG. 6). At this point the second processor either proceeds, if the branch was successful, or fetches the instruction at the location following the branch instruction.

Store operations (all instructions that modify main storage) must be interlocked because of the possibility that the storage area modified may contain the subsequent instruction or the data used by that instruction. When the processor executing the instruction that follows a store-type instruction is ready to proceed into the execution phase, it tests a flag (designated "SIP" in FIG. 6) that indicates whether the preceding instruction was a store type. If it was, the processor compares the current instruction address with the address of the Store operand, which was placed in Local Storage by the processor executing the Store. If the addresses are equal, this processor must refetch the current instruction from main storage. Other flags are provided (designated "ADRST" and "STDONE" in FIG. 6) to cause this processor to wait if the other processor executing the store instruction has not completed the store operation. Furthermore, the processor executing a store-type instruction does not proceed to do the actual storage until the preceding instruction execution has been completed. This prevents the processor executing the store-type instruction from placing data in storage before the other processor executing the preceding instruction has been able to fetch its operand from storage, in case the addresses might be identical.

Another interlock consists of the processor executing the store instruction permitting the other processor executing the subsequent instruction to enter the execution phase only when the store is complete. This prevents the subsequent instruction from loading the old value of an operand from storage before the storage instruction has placed the modified operand in storage, in case the addresses are the same.

An example of the timing of two processors executing an instruction sequence is given subsequently. Several of the interlocks are illustrated. Other more complicated designs of the interlock system are clearly possible. However, improvement achieved by the additional parallelism permitted by more sophisticated interlocks might be counterbalanced by the increased time required to make additional tests and by the costs of hardware.

In the present embodiment, certain shared flags are implemented as latches that can be sensed and set or reset by micro-instructions executed by both processors. Certain other shared flags (the register availability flags) are implemented in this embodiment as bits in Local Storage. Flags that must be test and set to one in one-half of a machine cycle must be implemented as latches. Others may be implemented as bits in Local Storage. As many register availability flags of these are required as are necessary to indicate the availability of the general and floating point registers. Their use has been described previously.

Another category of flags is the set of status flags. A number of these are used to represent various states of the instruction execution. Examples of status flags are described in the following samples. Use of some of the status flags requires a Test and Set (TS) type micro-instruction. The TS micro-instruction branches to the address in micro-instruction store given in the address fields of the micro-instruction if the latch tested is in its "1" state. Otherwise, if the latch is in its "0" state, it is set to "1" and the next sequential micro-instruction is executed.

The I-Phase Lock (IPL) is an example of a status flag. It is tested by each processor before the processor begins fetching the next machine language instruction. If the flag (lock) is in the one state, the processor continues testing until the lock becomes zero. Once a processor tests the lock and finds it zero, the processor sets the lock to one and performs instruction fetch functions. Only when the other processor may start processing the next instruction, will a processor reset the lock to zero.

Under certain circumstances, with the above procedure, an error might occur. If the IPL is zero and both processors are completing the processing of their current instructions, then it is possible for both to test the lock simultaneously, both detect the zero state, both set the lock to one, and both proceed into the I-phase under the assumption that the other processor is locked out. This results in errors, which are eliminated by providing a TS-type of micro-operation that tests the latch corresponding to the lock and simultaneously sets it to one. Since the processor cycles are staggered by one-half machine cycle, if the other processor tested the latch, it would find it set to "1".

The following Tables I and II set forth the designation of the principal hardware interlocks used and illustrated in the present embodiment. All but the Condition Code Flag (CCF) appear on FIG. 6.

The CCF interlock appears on FIG. 7B in the control circuitry for each processor. Thus, each processor has its own CCF interlock.

Table I defines the abbreviations for the interlocks as shown in the figures and as used in this specification.

Table II defines the meaning in terms of system operation when each of these interlocks is set to a "1." Obviously the negative of this function is implied when the interlock is set to a "0".

TABLE I

Definition of Latches Used in FIG. 7 (A – O)

| | |
|---|---|
| IPL | INSTRUCTION PHASE LOCK |
| EPL | EXECUTION PHASE LOCK |
| SIP | STORE IN PROGRESS |
| BIP | BRANCH IN PROGRESS |
| ADRST | ADDRESS STORED |
| STDONE | STORAGE DONE |
| DECMD | DECISION MADE |
| SUC | SUCCESSFUL BRANCH |
| CCLK | CONDITION CODE LOCK |
| CCF | CONDITION CODE FLAGS (one in each processor control, i.e., FIG. 7B) |

TABLE II

| Interlock | Significance of Setting |
|---|---|
| IPL | = 1 WHEN SUBSEQUENT PROCESSOR NOT ALLOWED TO ENTER INSTRUCTION FETCH PHASE. |
| EPL | = 1 WHEN SUBSEQUENT PROCESSOR NOT ALLOWED TO ENTER EXECUTION PHASE. |
| SIP | = 1 WHEN A PROCESSOR HAS EXECUTED A STORE TYPE INSTRUCTION. |
| BIP | = 1 WHEN A PROCESSOR HAS EXECUTED A BRANCH TYPE INSTRUCTION. |
| ADRST | = 1 WHEN ADDRESS IN MAIN STORAGE WHERE A STORAGE TYPE INSTRUCTION IS PLACING DATA HAS BEEN PLACED IN LOCAL STORE. |
| STDONE | = 1 WHEN PROCESSOR IS EXECUTING A STORE TYPE INSTRUCTION. |
| DECMD | = 1 WHEN PROCESSOR IS STILL CALCULATING WHETHER OR NOT TO TAKE A BRANCH FOR A BRANCH TYPE INSTRUCTION |
| SUC | = 1 IF A BRANCH IS TAKEN WITH A BRANCH TYPE INSTRUCTION. |
| CCF (2) | = 1 IF A PROCESSOR WILL MODIFY THE CONDITION CODE DURING |

EXECUTION OF AN INSTRUCTION.

General Description of the Microprogram Techniques

The following Tables 1–5 are essentially flow charts which illustrate certain typical sequences of micro-instructions utilized with the present system.

Tables 1A, 1B and 1C comprise flow charts which illustrate the sequence of micro-instructions necessary to perform an "instruction fetch." In referring to these tables in the right-hand column it will be noted that they all include an A portion which specifies the actual micro-instruction function to be performed. Further, a great many micro-instructions also include a B portion as well as a C portion. The location of these various micro-instruction portions or fields in the total micro-instruction obtained from the micro-instruction sotre is shown at the top of FIG. 7A where the micro-instruction register (MIR) is shown. It will be noted that this has an A, B, C and D field. The A field of the micro-instruction obviously will be set into the appropriate field of the MIR register. The same holds true for the B, C, and D fields. The D field is, as will be apparent from the subsequent specific description of the embodiment, utilized by itself or together with the C field for certain address designations.

The present system is designed to operate using a machine language format similar to the IBM System/360 organization. In a non-microprogrammed machine, as each instruction is processed by a CPU, its OP-code is examined and, depending upon the binary pattern, certain hardware will be caused to function directly. In the present system, the micro-instruction store in essence interfaces between the conventional machine language instruction and the processor which happens to be working on the particular instruction. The OP-code is in essence decoded into a micro-instruction store address which will result in certain sequences of micro-instructions being withdrawn from the micro-instruction store, and processed for the purpose of performing the desired operation and examining interlocks, setting interlocks, and designating certain other required operations necessary for the present system to work in the multi-processing mode.

The present list of flow charts in Tables 1–5, as is apparent, represents only a fraction of the total micro-instructions which would be necessary to successfully run a typical multi-processing system organized according to the teachings of the present invention. However, it is believed that the five sequences of operations represented by these flow charts clearly indicate the organizational and architectural concept of the presently disclosed system. In these flow charts, Tables 1A, 1B and 1C comprise flow charts which illustrate the sequence of micro-instructions necessary to perform an "instruction fetch."

Tables 2A, 2B, 2C and 2D comprise flow charts showing the micro-instruction sequence for an "add" operation.

Tables 3A and 3B comprise flow charts showing the sequence of micro-instructions necessary to perform a "store" operation.

Tables 4A, 4B and 4C comprise flow charts showing the micro-instruction sequence necessary to perform a "branch on count" operation.

Tables 5A and 5B comprise flow charts showing the micro-instruction sequence necessary to perform a "branch on condition" operation. As will be apparent to those skilled in the art, the processor executes micro-instructions in the sequences as obtained from the micro-instruction store under control of the micro-instruction counter unless a branch is required. When a branch is required, the address in the micro-instruction counter is replaced by the address of the micro-instruction to which it is desired to branch. The micro-instruction register MIR is shown at the extreme top of FIG. 7A as mentioned previously. The micro-instruction coutner MIC is shown at the extreme bottom of FIG. 7O. The micro-instructions that are available in the present exemplary embodiment are clearly set forth in FIG. 3A. It is again noted that FIGS. 3B and 3C designate the particular latches, registers and other mechanisms within the embodiment which are affected by the micro-instructions specified in FIG. 3A.

The subsequent specific description of the present embodiment which follows the tables of micro-instructions will trace the operation of combinations of these micro-instructions throughout the hardware and more particularly the circuitry of FIGS. 7A–7O.

It should also be noted in passing that in Tables 1–5 a number of tests are made and, depending upon the results of the tests, the micro-instruction sequence will either proceed sequentially or will branch to another point. The branches are clearly labeled with letters insofar as the branching indication is concerned. Similarly the entry points into other micro-instruction sequences are similarly labeled with matching letters. Thus, in Table 4, micro-instruction A17 tests the result of subtracting 1 from the contents of register R5, and if it is not zero the micro-instruction sequence branches to "L". It will be noted subsequently in the table that L is designated as the entry point into a further micro-instruction sequence beginning with A0.B7. The other branches in the micro-instruction sequence are similarly clearly marked wherein it will, of course, be noted that some branch back into other tables and some branch back to execute the same micro-instruction again.

In Tables 1–5 the address fields are not given. It should be obvious to one skilled in the art that arbitrary assignments of specific addresses in local storage and micro-instruction storage are easily made.

For example, no address is assigned to "PSWIC," used in the second micro-instruction of Table 1A. Nonetheless, one skilled in the art could assign a location in Local Storage to "PSWIC" and fix the C and D fields of the micro-instruction A3 · B0 to correspond to this location.

Under certain circumstances, two or more micro-instructions in Tables 1–5 may appear similar although, the addresses would be different. For example, in Table 2, the sixth micro-instruction is A5 · B0 · C1 and the eighth is A5 · B2 · C1. Since the A and C fields are identical, each micro-instruction fetches a word from local storage using the rl field of register R1 for the low order bits of the local storage address. However, the D fields of the two micro-instructions are different, although this is not shown in Table 2. Consequently, the sixth micro-instruction of Table 2 fetches from an area in local storage reserved for availability bits, and the eighth fetches from an area reserved for General Register contents. One skilled in the art could easily make a proper designation of the D field addresses for the micro-instructions.

TABLE 1A

INSTRUCTION FETCH SEQUENCE

OPERATION PERFORMED — MICRO-INSTRUCTION LINES ACTIVATED

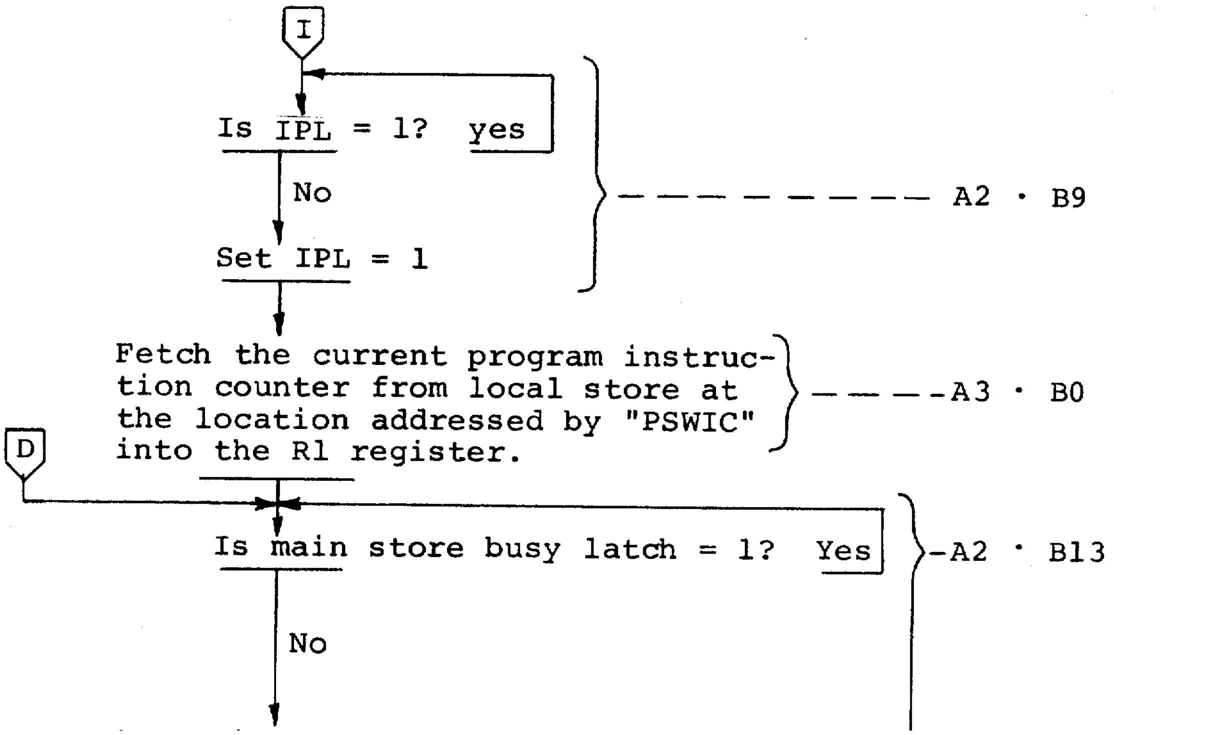

Read select main store at the location specified by the contents of the R1 register. Route the data read into the R2 register. — A9 · B1 · C2

Is "SIP" (store in progress) = 0? — A12 · B1
No → (Go To A)

Yes

Is "BIP" (branch in progress) = 0? — A12 · B2
No → (Go To B)

Yes (C)

Is EPL = 1? Yes

No

Set EPL = 1 — A2 · B3

Increment R1 — A19 · B0

Write the updated program instruction counter, which is in the R1 register, into local store at the location "PSWIC." — A4 · B0

Is "Data Valid" = 1? No — A11 · B14

Yes

Develop micro-instruction store branch address by combining the high order field of the R2 register with the micro-instruction address operand field. — A13

Unconditional branch from table entry to beginning of micro-instruction sequence for current machine language instruction. — A21

TABLE 1B
OPERATION PERFORMED — MICRO-INSTRUCTION LINES ACTIVATED
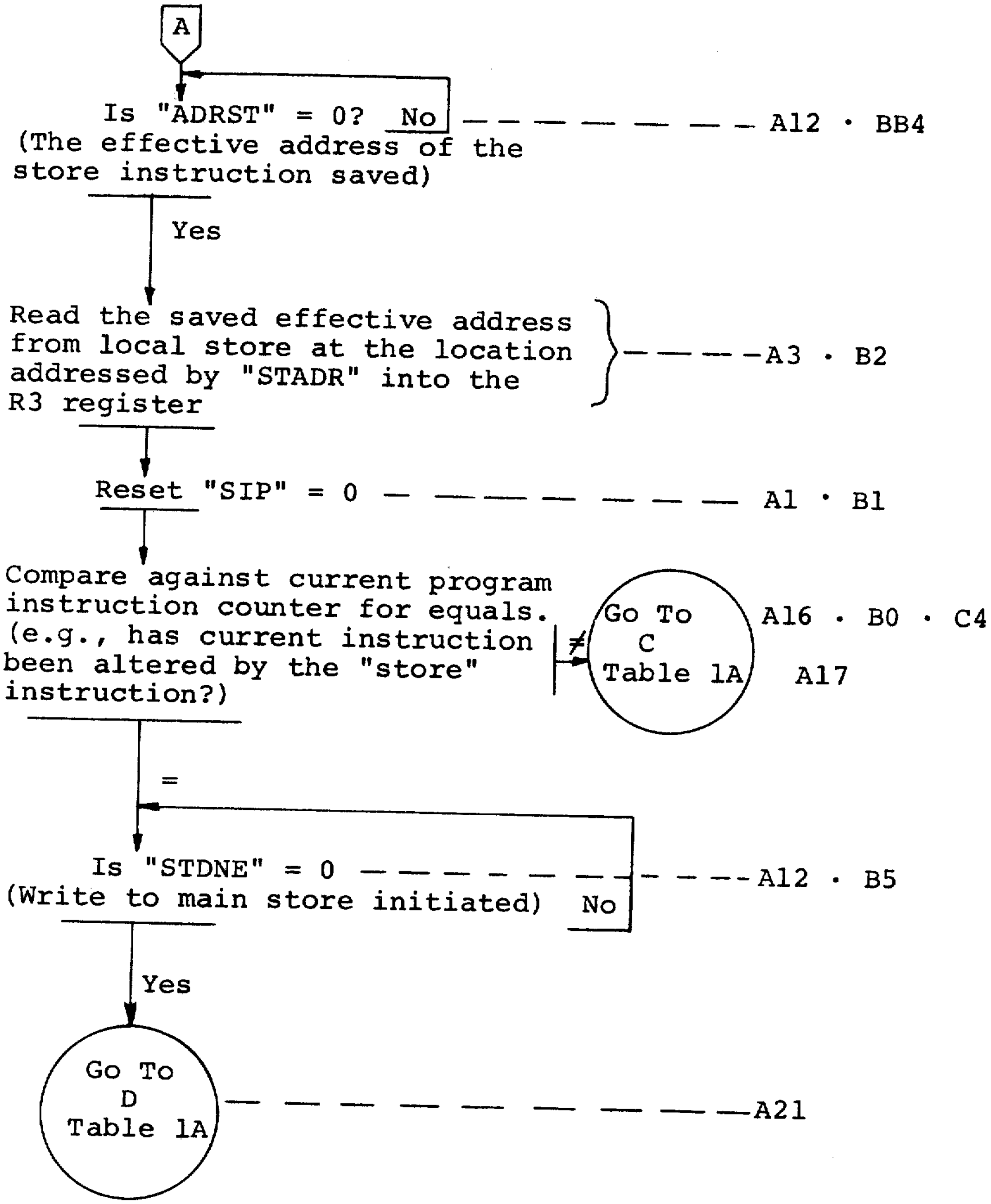

TABLE 1C

| OPERATION PERFORMED | MICRO-INSTRUCTION LINES ACTIVATED |
|---|---|
| B | |
| Is "DECMD" = 0? No (Branch decision made) | A12 · B6 |
| Yes | |
| Reset BIP = 0 | A1 · B2 |
| Is "SUC" = 1? No → Go To C Table 1A | A11 · B7 |
| Yes | |
| Fetch saved address from local store at location "STADR" into R1 register. (E.G. Altered program instruction counter) | A3 · B0 |
| Go To D Table 1A | A21 |

TABLE 2

ADD SEQUENCE

| OPERATION PERFORMED | MICRO-INSTRUCTION LINES ACTIVATED |
|---|---|
| ADD | |
| Is "CCLK" - 1? Yes | A2 · B8 |
| No | |
| Set ""CLK" = 1 | |
| Reset "IPL" = 0 | A1 · B9 |

Reset "CCF" of other processor = 0 — — — A1 · B11

Set "CCF" of this processor = 1 — — — A0 · B10

Reset "CCLK" = 0 — — — — — — — A1 · B8

Read LS indirect using D field of IR for high order address bits and X2 field of R2 for low order address bits. Read data into R1. — — — A5 · B0 · C1

Is "availability bit" = 0? No — A12 · B12

Yes

Read LS indirect using D field of IR for high order address bits and X2 field of R2 for low order address bits. Read data into R3. — — — A5 · B2 · C1

Calculate main store effective address. Add R3 register to low order field of R2. Place result in R3. — — — — A22 · B0; A20 · B0 · C9; A15 · B2 · C2

Is main store busy latch = 1? Yes

No

Set main store busy latch = 1 — — — A2 · B13

Read main store indirect as addressed by R3 into R4 — — — — — A9 · B3 · C4

Read LS indirect using D field of IR for high order address bits and r1 field of R2 for low order address bits. Read data into R1. — — — A5 · B0 · C0

Is "availability bit" = 0? No — — — — — — A12 · B12

Yes

Set "availability bit" = 1 — — — — — A0 · B12

Write R1 into LS using D field of IR for high order address bits and r1 field of R2 for low order address bits. — — — A6 · B0 · C0

Reset EPL = 0 — — — A1 · B3

Read LS indirect using D field of IR for high order address bits and rl field of R2 for low order address bits. Read data into R5. — — — A5 · B4 · C0

Is "Data Valid" = 1? No — — — A11 · B14

Yes

Add R4 to R5, placing result in R5 — — — A15 · B4 · C5

Write R5 into LS indirect using D field of IR for high order address bits and rl field of R2 for low order bits. — — A6 · B4 · C0

Read LS indirect using D field of IR for high order address bits and rl field of R2 for low order address bits. Read data into R1. — — A5 · B0 · C0

Reset "availability bit" = 0 — — — A1 · B12

Write R1 into LS using D field of IR for high order address bits and rl field of R2 for low order address bits. — — A6 · B0 · C0

Is "CCLK" = 1? Yes

No

Set "CCLK" = 1 — — — A2 · B8

Is "CCF" for this processor = 1? — A11 · B10

No → Go To E

Yes

Move condition code from ALU to shared condition code register — — — A20 · B5 · C10

Reset "CCF" of this processor = 0 — — — A1 · B10

E

Reset "CCLK" = 0 — — — — — — A1 · B8

(Go To I Table 1A) — — — — — — — A21

TABLE 3

STORE SEQUENCE

| OPERATION PERFORMED | MICRO-INSTRUCTION LINES ACTIVATED |
|---|---|
| Set "SIP" = 1 | A0 · B1 |
| Set "ADRST" = 1 | A0 · B4 |
| Set "STDONE" = 1 | A0 · B5 |
| Reset "IPL" = 0 | A1 · B9 |
| Read LS indirect using D field of IR for high order address bits and X2 field of R2 for low order address bits. Read data into R1. | A5 · B0 · C1 |
| Is "availability bit" = 0? No (return to read LS step) / Yes | A12 · B12 |
| Read LS indirect using D field of IR for high order address bits and X2 field of R2 for low order address bits. Read data into R3. | A5 · B2 · C1 |
| Calculate main store effective address. Add R3 to low order field of R2. Place result in R3. | A22 · B3<br>A20 · B3 · C9<br>A15 · B2 · C5 |

Write R3 into LS at the location addressed by "STADR". — A4 · B2

Reset "ADRST" = 0 — A1 · B4

Read LS indirect using D field of IR for high order address bits and r1 field of R2 for low order address bits. Read data into R1. — A5 · B0 · C0

Is "availability bit" = 0? No — A12 · B12

Yes

Read LS indirect using D field of IR for high order address bits and r1 field of R2 for low order address bits. Read data into R5. — A5 · B4 · C0

Reset "EPL" = 0 — A1 · B3

Is main store busy latch = 1? Yes

No

Set main store busy latch = 1

(the two steps above) — A2 · B13

Write R5 into main store as addressed (effective address) by the contents of R3. — A10 · B4 · C4

Reset "STDONE" = 0 — A1 · B5

Go To I Table 1A — A21

TABLE 4

BRANCH ON COUNT SEQUENCE

| OPERATION PERFORMED | MICRO-INSTRUCTION LINES ACTIVATED |
|---|---|
| Set "BIP" = 1 | A0 · B2 |
| Set "DECMD" = 1 | A0 · B6 |
| Reset "IPL" = 0 | A1 · B9 |
| Read LS indirect using D field of IR for high order address bits and r1 field of R2 for low order address bits. Read data into R1. | A5 · B0 · C0 |
| Is "availability bit" = 0? No (return to Read LS indirect ... Read data into R1.) / Yes | A12 · B12 |
| Read LS indirect using D field of IR for high order address bits and r1 field of R2 for low order address bits. Read data into R5. | A5 · B4 · C0 |
| Decrement R5 | A18 · B4 |
| Write R5 into LS using D field of IR for high order address bits and r1 field of R2 for low order address bits. | A6 · B4 · C0 |
| Was the result of decrementing R5 all zeros? No → Go To L / Yes | A17 |
| Reset "EPL" = 0 | A1 · B3 |
| Reset "DECMD" = 0 | A1 · B6 |

Reset "SUC" = 0 — — — A1 · B7

Go To I Table 1A — — — A21

L

Set "SUC" = 1 — — — A0 · B7

Read LS indirect using D field of IR for high order address bits and X2 field of R2 for low order address bits. Read data into R1. — — — A5 · B0 · C1

Is "availability bit" = 0? No — — — A12 · B12

Yes

Read LS indirect using D field of IR for high order address bits and X2 field of R2 for low order address bits. Read data into R4. — — — A5 · B3 · C1

Calculate main store effective branch address (altering program instruction counter). Add R4 to low order field of R2. Place result in R4. — — — A22 · B4; A20 · B4 · C9; A15 · B3 · C6

Write R4 into LS direct at the location addressed by "STADR". — — — A4 · B3

Reset "DECMD" = 0 — — — A1 · B6

Reset "EPL" = 0 — — — A1 · B3

Go To I Table 1A — — — A21

TABLE 5

BRANCH ON CONDITION SEQUENCE

| OPERATION PERFORMED | MICRO-INSTRUCTION LINES ACTIVATED |
|---|---|
| Set "BIP" = 1 | A0 · B2 |
| Set "DECMD" = 1 | A0 · B6 |
| Reset "IPL" = 0 | A1 · B9 |
| Is "CCF" of other processor = 0? No (return to above) / Yes | A12 · B11 |
| Reset R5 to all zeros | A22 · B4 |
| Move C and D fields of IR to R5 | A20 · B4 · C11 |
| Move shared condition code register to R5 | A20 · B4 · C7 |
| Read LS into R4 as addressed by contents of R5 | A5 · B3 · C6 |
| Move r1 field of R2 to R5 | A20 · B4 · C12 |
| AND R4 with R5 | A14 · B4 · C5 |
| Is result of above = 0? No → Go To L Table 4 / Yes | A17 |
| Reset "BIP" = 0 | A1 · B2 |
| Reset "SUC" = 0 | A1 · B7 |

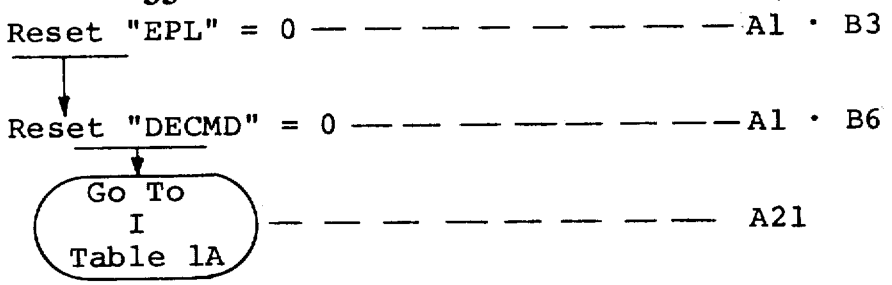

Description of the Operation of the Specific Embodiment of FIGS. 4 through 7 (A–O)

Referring to FIG. 7A, it will be noted that the micro-instruction register is divided into four fields labeled A, B, C and D. The A field is decoded into wires labeled $A_0$ through $A_{22}$ inclusive. The B field is decided into wires labeled $B_0$ through $B_{14}$. The C field is decoded into wires labeled $C_0$ through $C_{12}$.

In FIGS. 7A–O, and primarily on FIGS. 7A–G, it will be noted that there are a plurality of input signals listed as input to various lines. This designation indicates that an ANDing operation is implied here. For simplicity, the AND boxes have been left out. Thus, for example, on FIG. 7, the concurrent existence of "1" signals on the lines A10 · B4 · C4 · CL-3 causes wire 340 to be actuated on FIG. 7F. This same operation is implied throughout the present embodiment.

Referring to FIG. 3A, it will be seen that the list of wires $A_0$ through $A_{22}$ is shown at the left of the table, and this list constitutes the set of micro-instructions that are used in this machine. For example, if wire $A_0$ is active it means "SET LATCH." The particular latch that is set is indicated by the active state of one of the B wires. Referring to FIG. 7A, it will be seen that the active states of wires $A_0$ and $B_1$ allow CL-3 to set the "SIP" latch. In other words, the CL-3 pulse is applied to wire 132 which extends via cable 272 and cable 114 to FIG. 15 where it will be seen that wire 132 is applied to the OR circuit, the output of which is used to set "SIP" to its "1" state. The latches "BIP" "EPL," "ADRST," and the "STDONE" latches can be set by allowing the CL-3 pulse to be applied to wires 136, 140, 144 or 148. These wires all extend via cables 272 and 114 to FIG. 6 where it will be seen that a pulse on wire 136 is effective to set "BIP" to its "1" state. A pulse on wire 140 is effective to set "EPL" to its "1" state. A pulse on wire 144 is effective to set "ADRST" to its "1" state. A pulse on wire 148 is effective to set "STDONE" to its "1" state. The wires 176, 180, 184 and 188 (FIG. 7A) extend via cable 274 and cable 118 to FIG. 6. On FIG. 6 pulses on these wires are used to set the latches "DECMD," "SUC," "CCLK," and "IPL" to their "1" states.

Near the bottom of FIG. 7A it will be seen that the active state of wire $A_0$ and the active state of wire $B_{10}$ allow the CL-3 pulse to set the CCF latch of this processor to its "1" state. A pulse on wire 233 which comes from the processor B can also be used to set the CCF latch of this processor to its "1" state. Near the bottom of FIG. 7B it will be noted that the active state of wire $A_0$ and the active state of wire $B_{11}$ allow the CL-3 pulse to set the CCF of the processor B to its "1" state. This is done by the pulse on wire 232 which extends via cable 100 to the processor B where a similar "CCF" latch is located. Also, at the bottom of FIG. 7B it will be noted that the active state of wire $A_0$ and the active state of wire $B_{12}$ applies a pulse to wire 280 which extends via cable 256 to FIG. 7I where it is effective to set the availability latch of this processor to its "1" state.

Considering next the active state of wire $A_1$ which means "RESET LATCH," it will be noted that on FIG. 7A active state of wire $A_1$ can be ANDed with the active state of wires $B_1$ through $B_{10}$, in order to reset latches "SIP," "BIP," "EPL," "ADRST," "STDONE," "DECEMD," "SUC," "CCLK," "IPL," and the "CCF" of this processor. The wires involved can easily be traced via either cable 276 or cable 278 which extend via cables 114 and 118 to FIG. 6. At the bottom of FIG. 7A the active state of wire $A_1$ ANDed with the active state of wire $B_{10}$ allows the CL-3 pulse to reset the CCF latch of processor A. Near the bottom of FIG. 7B it will be noted that the active state of wire $A_1$ and the active state of wire $B_{11}$ allow the CL-3 pulse to reset the "CCF" latch of processor B. This pulse extends via wire 234 and wire 100 to the other processor. Also, near the bottom of FIG. 7B, it will be noted that the active state of wire $A_1$ and the active state of wire $B_{12}$ allow the CL-3 pulse to reset the availability latch of processor A to "0" which is shown on FIG. 7I.

The active state of wire $A_2$ means "TEST & SET LATCH TO 1". To execute this particular micro-instruction, the latch selected is tested to see if it is in its "1" state. If it is in its "1" state, the instruction can be repeated until it is found that the latch is in its "0" state. If it is found that the latch is in its "0" state, the micro-instruction sets the latch equal to "1" and proceeds to the next micro-instruction in sequence. The detailed way in which this is accomplished for the EPL latch is as follows. On FIG. 7B the wires 164, 200, 204 and 230 come from FIGS. 5 and 6 via cables 116, 120 and 112. On FIG. 6, wire 164 is the "1" output of latch "EPL". The wire 200 is the "1" output of the latch "CCLK." The wire 204 is the "1" output of the "IPL" latch.

On FIG. 5, wire 230 is the "1" output of the "MAIN STORAGE BUSY" latch.

Referring again to FIG. 7B it will be noted that wire 164 is one input to AND circuit 440. If the $A_2$ line and the $B_3$ line are both active, they permit the CL-3 pulse to be applied to AND circuit 440. THus, fi the "EPL" latch is on "1" a pulse will be delivered to set latch 248 to its "1" state. Latch 248 is on FIG. 7D. In this manner, the normal incrementing of the micro-instruction counter, as shown at the bottom of FIG. 7O, will be inhibited. In other words, the line labeled 248 will be inactive, and the CL-4 pulse will not be able to increment the micro-instruction counter.

On FIG. 7O the active state of wire 248 will permit the CL-4 pulse to be applied to gates 446 and 448. The D field of the micro-instruction register will be gated into the right-hand portion of the micro-instruction counter and the C field of the instruction register will be gated into the left-hand portion of the micro-instruction counter. These two fields come via cables 250 and 254 which are part of cable 256 which comes from FIG. 7A. In this manner, the instruction can be repeated because the C and D fields of the instruction register can contain the same address as was in the micro-instruction counter previously. In other words, the instruction branches to itself. The Test and Set instruction can be repeated if the C, D fields in the instruction register havm the same address as was in the micro-instruction counter. In some cases the "Test and Set" instruction could branch to some other address and in these cases the C and D fields in the micro-instruction register would contain something different than the previous setting of the micro-instruction counter.

Referring again to FIG. 7B, if wire 164 is not active, AND circuit 440 will not have an output to set latch 248. Under these circumstances, the active state of wire $A_2$ AND wire $B_3$ AND wire 248 will permit the CL-4 pulse to be applied to wire 140 which extends via cable 114 to FIG. 6 where it sets the "EPL" latch to its "1" state. In this case, the micro-instruction counter is incremented in the normal manner and the micro-program proceeds to the next micro-instruction in sequence.

While the embodiment only shows how to test and set four latches, it is obvious that other latches could be tested and set in the same manner.

Referring to FIG. 3, the active state of wire $A_3$ means "Read Local Store Direct." The register into which the local store is read is indicated by the active state of one of the B wires, $B_0 - B_4$. Five "Read Local Store Direct" instructions are listed on FIG. 7D. It will be noted that they all result in the active state of wire 310 which is on FIG. 7. Wire 310 extends via cable 256 to FIG. 7E, where it is used to gate a portion of the C field and the D field to cable 208 which extends via cable 106 to FIG. 4. On FIG. 4 it will be noted that cable 208 furnishes the address for the Local Store.

Figure 7K:
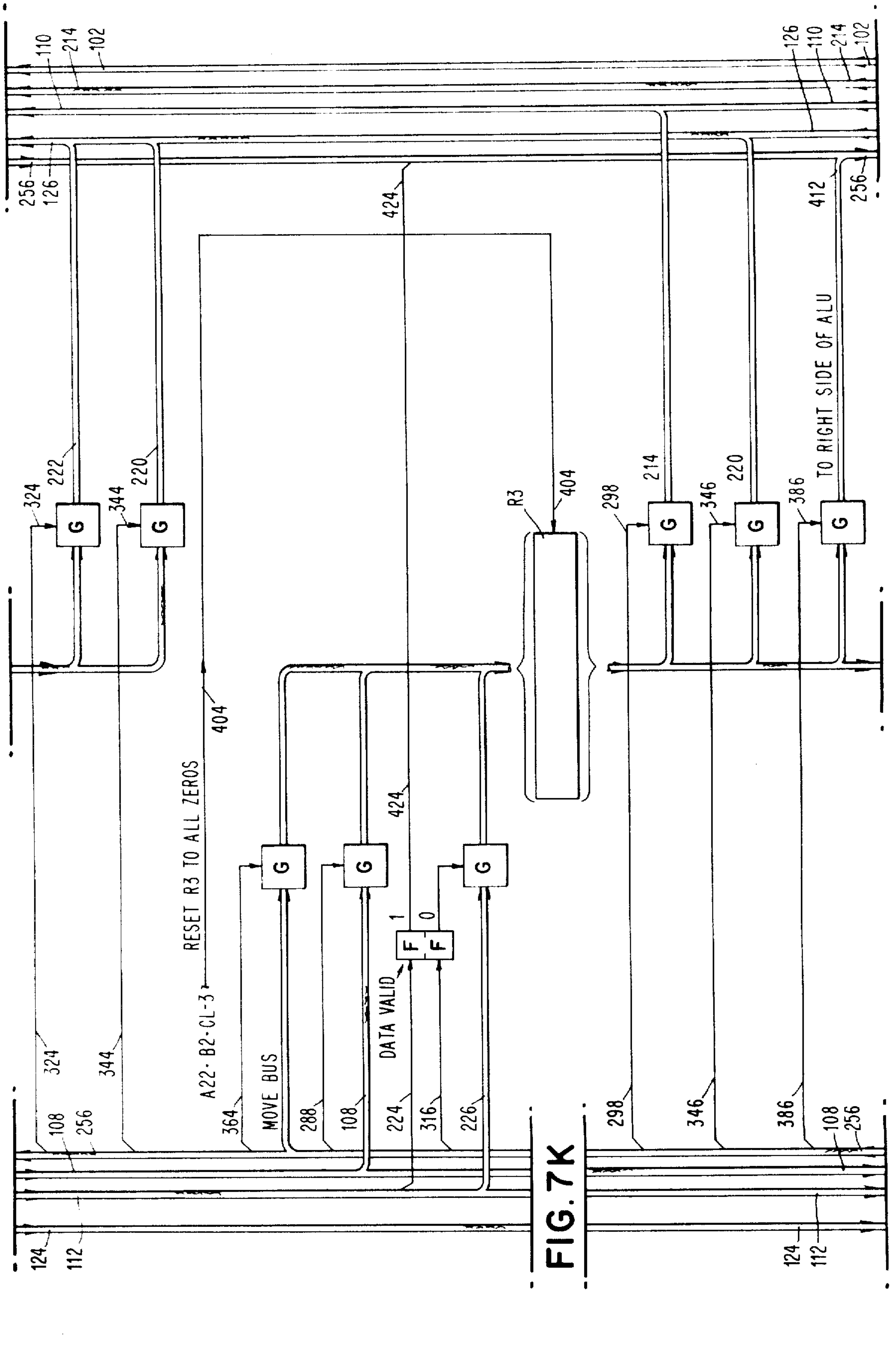
Figure 7L:
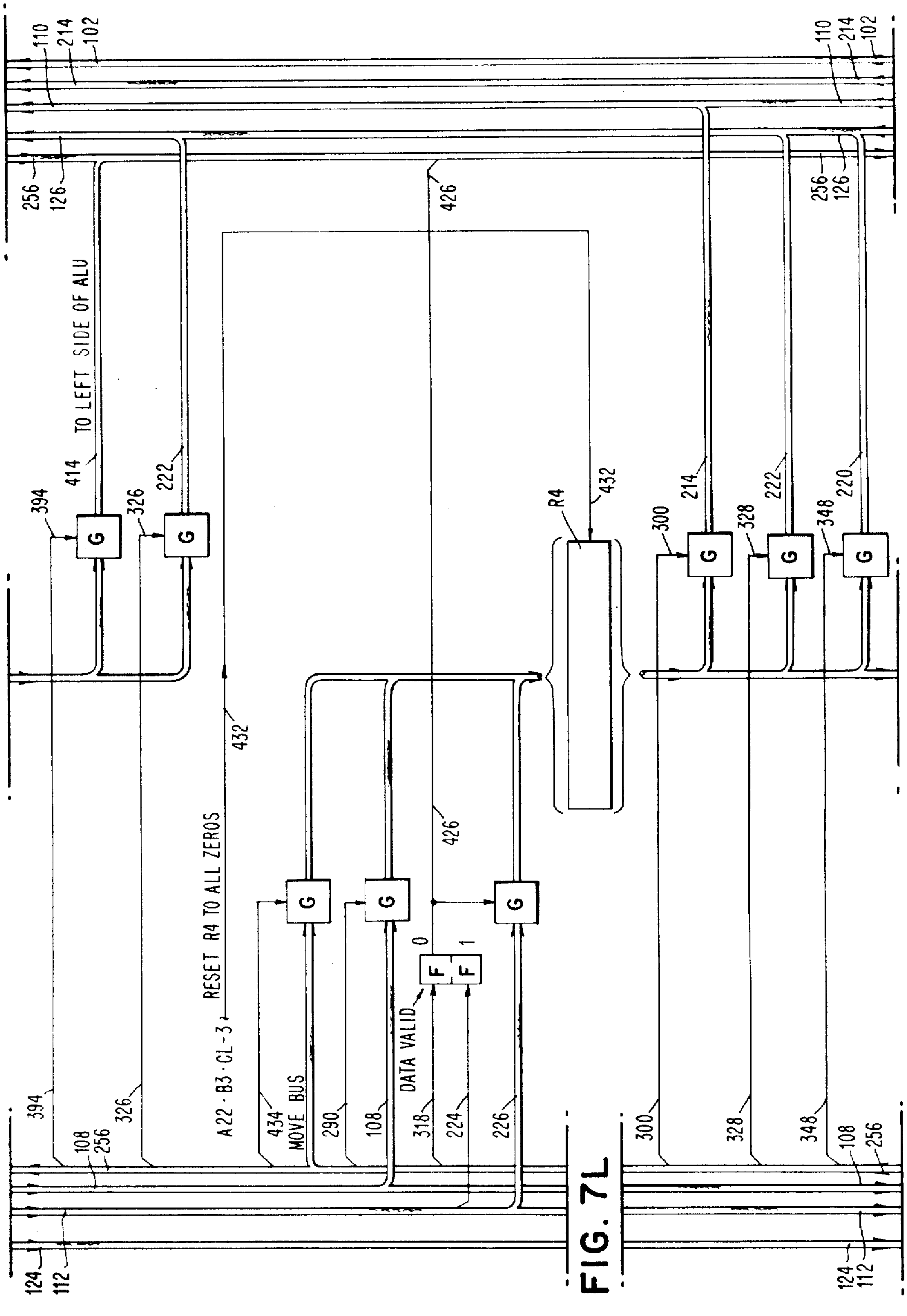
Figure 7M:
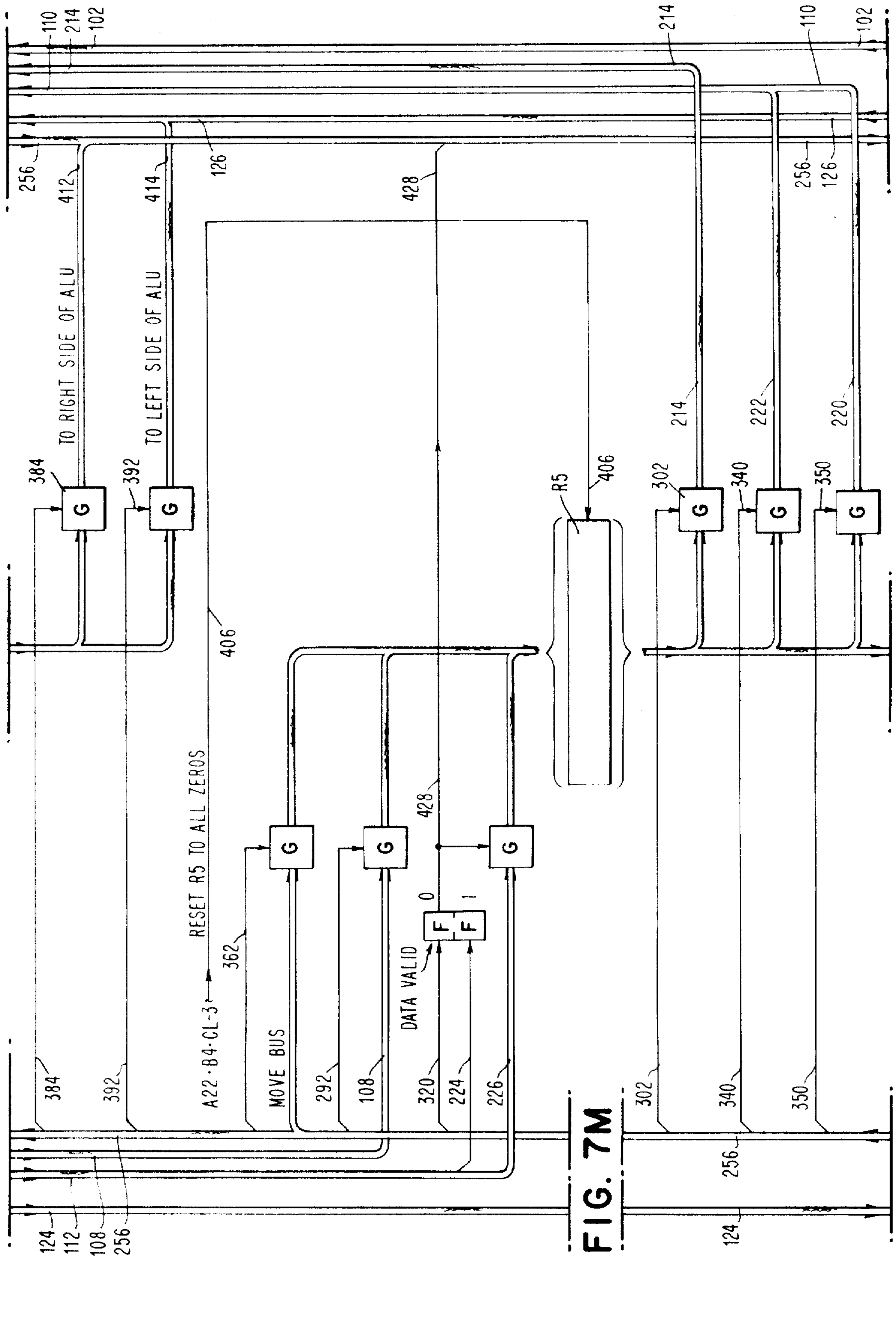

Referring again to FIG. 7D, and FIG. 7E, the five just mentioned micro-instructions result in the active state of wire 210 which extends via cable 106 to FIG. 4 where it causes a read access of Local Store. Referring again to FIG. 7D and 7E, one of the wires 284, 286, 288, 290 or 292 will become active according to which register it is desired to read the data into. Wire 284 extends via cable 256 to FIG. 7I where it gates cable 108 to register $R_1$. Cable 108 comes from FIG. 4 and contains the contents of the word read from Local Store. Wire 286 extends to FIG. 7J where it gates cable 108 to register $R_2$. Wire 288 extends to FIG. 7K where it gates cable 108 to register $R_3$. Wire 290 extends to FIG. 7L where it gates cable 108 to register $R_4$. Wire 292 extends to FIG. 7M where it gates cable 108 to register $R_5$.

Referring to FIG. 3, the active state of $A_4$ means "Write Local Store Direct". There are five of this type of micro-instruction illustrated on FIG. 7D. The wire $B_0$ through $B_4$ indicates the register from which it is desired to write into Local Store. For any of these micro-instructions, wire 212 will become active. Wire 212 extends via cable 106 to FIG. 4 where it requests a write access of Local Store. Also, for any of these micro-instructions, wire 310 on FIG. 7E will become active. The purpose of wire 310 was explained previously. If the data to be written into Local Store is in register $R_1$, wire 294 on FIG. 7E will become active. Wire 294 extends to FIG. 7I where it gates the contents of register $R_1$ to cable 214. Cable 214 extends via cable 106 to FIG. 4 where it furnishes the data to be stored in Local Store. If the data to be stored is contained in register $R_2$, wire 296 becomes active. Wire 296 extends to FIG. 7J where it is used to gate the contents of register $R_2$ to cable 214. If the data to be stored is contained in register $R_3$, wire 298 on FIG. 7E becomes active. Wire 298 extends to FIG. 7K where it is used to gate the contents of the register $R_3$ to cable 214. If the data to be stored is contained in register $R_4$, wire 300 becomes active. Wire 300 extends to FIG. 7L where it is used to gate the contents of register $R_4$ to cable 214. If the data to be stored is contained in register $R_5$, wire 302 becomes active. Wire 302 extends to FIG. 7M where it is used to gate the contents of register $R_5$ to cable 214.

When the $A_5$ wire is active, it means a "Read Local Store Indirect" micro-instruction. The register into which the word is to be read is specified, as before, by one of the B wires being active. The address for Local Store is developed by using the D field of the micro-instruction register for the high order bits of the Local Store Address. The active state of either of the $C_0$ or $C_1$ wire will specify either the $r_1$ or $x_2$ field of the register $R_2$ for the low order bits of the Local Store Address.

On FIG. 7D and 7E there are ten micro-instructions which involve the active state of wire $A_5$. The wires that become active as a result of this micro-instruction are shown on FIGS. 7D and E. For example, wire 210 becomes active which, as previously explained, requests a Local Store Read Access.

The gating between Local Store and the register which is to receive the data from Local Store is set up by one of the wires 284 through 294 of FIGS. 7D and 7E. These wires have been previously traced in connection with the explanation of the Read Local Store Direct Micro-Instruction.

If the $r_1$ field of register $R_2$ is to be used for the low order address bits of the Local Store, wire 306 on FIG. 7E becomes active. Wire 306 extends to FIG. 7J where it is used to gate the $r_1$ field of register $R_2$ to cable 264. Cable 264 extends to FIG. 7A where it goes into cable 208. As explained previously, cable 208 extends via cable 106 to FIG. 4 where it supplies the address for the local store.

If the $x_2$ field of register $R_2$ is to be used for the low order address bits of Local Store, wire 308 in FIG. 7E becomes active. Wire 308 extends to FIG. 7J where it is used to gate the $x_2$ field of $R_2$ to cable 264. On FIG. 7E, wire 304 will become active. Wire 304 extends to FIG. 7A where it is used to gate a portion of the D field of the instruction register to cable 262 which extends to cable 208.

Referring to FIG. 3 the active state of wire $A_6$ means a "Write Local Store Indirect" instruction. The address for Local Store is assembled in the same manner as previously described for the "Read Local Store Indirect" micro-instruction. The active state of one of the B lines denotes the register which contains the data which is to be written into Local Store.

The active state of wire $A_7$ indicates the "Read Main Store Direct" micro-instruction. This micro-instruction is not implemented on FIG. 7 because it is not used in any of the sequences which have been prepared for this embodiment. However, it could be easily implemented because it implies that the C and D fields of Instruction Register are used for the main store address. The register which receives the memory wood from main store is specified by the active start of one of the B wires.

The active state of wire $A_8$ means "Write Main Store Direct." This instruction is not used in any of the sequences for this embodiment and so, is not illustrated on FIG. 7. The address for main store would be assembled in the same manner as just mentioned for the "Read Main Store Direct" instruction. The data to be written in main store would come from one of the R registers, which would be specified by the active state of one of the B wires.

The active state of wire $A_9$ means the "Read Main Store Indirect" micro-instruction. The R register to which the data is to be read is specified by the active state of one of the B wires. The main store address is also the contents of one of the R registers, which is specified by the active state of one of the C wires. Five micro instructions of this type are shown on FIG. 7F. It will be noted that if the data is to be read into a particular register, the "Data Valid" flip-flop for that particular register must first be reset to "0". The "Data Valid" flip-flop for each register has two purposes; one is to indicate that the data has been received from main store and the other purpose is to direct the data which comes from main store into the proper register.

Referring to FIG. 7F, the active state of wire 312 extends via cable 256 to FIG. 7I wher it resets the Data Valid flip-flop for register $R_1$ to its "0" state. On FIG. 7F the active state of wire 314 extends to FIG. 7J where it resets the "Data Valid" flip-flop register $R_2$ to its "0" state. On FIG. 7F the active state of wire 316 extends via cable 256 to FIG. 7K where it resets the "Data Valid" flip-flop of register $R_3$ to its "0" state. On FIG. 7F the active state of wire 318 extends via cable 256 to FIG. 7L where it resets the "Data Valid" flip-flop of register $R_4$ to its "0" state. On FIG. 7F the active state of wire 320 extends via cable 256 to FIG. 7M where it resets the "Data Valid" flip-flop of register $R_5$ to its "0" state. Referring to FIG. 7I, when the "Data Valid" flip-flop for register $R_1$ is in its "0" state, the cable 226 will be gated to the register $R_1$. Cable 226 comes from FIG. 5 and contains the contents of the memory data register for the main store. On FIG. 7F it will be noted that, when a read access of main storage is requested a pulse will appear on wire 216. Wire 216 extends via cable 110 to FIG. 5. On FIG. 5, the pulse on wire 216 requests a read access of main store. The pulse also sets flip-flop 450 to its "1" state. The same pulse also extends through the OR circuit 452 to set the "Main Store Busy" flip-flop to its "1" state. On FIG. 5, when the main store access is completed, a pulse appears on wire 454 which extends through the Delay Unit 462 to reset the main store busy flip-flop to its "0" state. The same pulse extends to AND circuit 456 to gate cable 226 to the processor. The completion signal on wire 454 also extends through gate 458 and the Delay Unit 460 to appear on wire 224 which extends back to the processor. Referring to FIGS. 7I then 7M, it will be noted that the pulse on wire 224 sets all of the "Data Valid" flip-flops to their "1" state. Referring again to FIG. 7F, it will be remembered that the C wire that is active specifies the register which furnishes the address for main store. If this address comes from register $R_1$wire 342 will be active. If the address comes from register $R_2$, wire 344 will be active. If the address comes from register $R_3$, wire 346 will be active. If the address comes from register $R_4$, wire 348 will be active. If the address comes from register $R_5$, wire 350 will be active. Wire 342 extends via cable 256 to FIG. 7I where it gates the contents of register $R_1$ to cable 220. Cable 220 extends via cable 110 to FIG. 5 where it furnishes the address for main store. Wire 344 extends to FIG. 7K where it gates the contents of register $R_2$ to cable 220. Wire 346 extends to FIG. 7K where it gates the contents of register $R_3$ to cable 220. Wire 348 extends to FIG. 7L where it gates the contents of register $R_4$ to cable 220. Wire 350 extends to FIG. 7M where it gates the contents of register $R_5$ to cable 220.

Referring to FIG. 13, the active state of wire $A_{10}$ indicates the "Write Main Store Indirect" micro-instruction. The data to be written into main store comes from one of the R registers which is specified by the active state of one of the B wires. The main store address comes from one of the R registers which is specified by the active state of one of the B wires. The main store address comes from one of the R registers which is specified by the active state of one of the C wires. It will be noted that the main store address is specified exactly as in the previous "Read Main Store Indirect" instruction. The only difference between this write instruction and the previous read instruction is that a line must come up in order to indicte the write main store access and the gating must be established from one of the R registers which contains the data to be written into main store. These things will be explained as follows. Referring to FIG. 7F, five of the $A_{10}$ instructions are illustrated. Wire 218 will become active. Wire 218 extends via cable 110 to FIG. 5. It requests a write access and also sets the main store busy flip-flop to its "1" state. If the data to be written comes from register $R_1$, wire 322 will become active. Wire 342 extends via cable 256 to FIG. 7I where it gates the contents of register $R_1$ to cable 222. Cable 222 extends via cable 110 to FIG. 5 where it supplies the data to be entered into the memory data register for the main store. Referring again to FIG. 7F, if the data to be written comes from register $R_2$, wire 324 will become active. Wire 324 extends via cable 256 to FIG. 7K where it gates the contents of register $R_2$ to cable 222. Referring again to FIG. 7F, if the data to be written comes from register $R_3$, wire 326 will become active. Wire 326 extends via cable 256 to FIG. 7K where it gates the contents of register $R_3$ to cable 222. Referring again to FIG. 7F, if the data to be written comes from register $R_4$, wire 328 will become active. Wire 328 extends via cable 266 to FIG. 7L where it gates the contents of register $R_4$ to cable 222. Referring again to FIG. 7F, if the data to be written comes from register $R_5$, wire 340 will become active. Wire 340 extends via cable 356 to FIG. 7M where it gates the contents of register $R_5$ to cable 222.

The active state of wire $A_{11}$ (FIG. 3) indicates the "test latch for '1'" micro-instruction. The latch to be tested is specified by the active state of one of the B wires. If the test succeeds, the micro-program will advance to the next micro-instruction in numerical sequence. If the test fails or in other words if it is found that the latch is on "0" the program branches to an address which is specified by the C and D fields of the micro-instruction register. Referring to FIG. 7C, three of the $A_{11}$ micro-instructions are shown. The first involves testing wire 198 which comes from the "0" side of the "SUC" latch on FIG. 6 and extends to FIG. 7C where it is an output to the AND circuit 446. The active states of wire $A_{11}$ AND wire $B_7$ allow the CL-3 pulse to be applied to AND circuit 446. If this AND circuit does not have an output, the micro-instruction counter will be incremented in the normal fashion. If the AND circuit 446 does have an output, it will set latch 248, and the contents of the micro-instruction counter will be replaced by the C and D fields of the micro-instruction register. The second of these micro-instructions involve the active state of the $A_{11}$ wire and the active state of the $B_{10}$ wire. These active states allow the CL-3 pulse to test AND circuit 466 the other input to which is wire 238 which comes from the "0" side of the "CCF" latch of the processor. Here again, if the test fails, AND circuit 446 will have an output to set latch 248, and the contents of the micro-instruction counter will be replaced by the C and D fields of the micro-instruction register. Referring again to FIG. 7C, the third micro-instruction involving the active state of wire $A_{11}$ is where it is ANDed with the active state of wire $B_{14}$. This involves a test to see if all of the "Data Valid" flip-flops are in their "1" state. It will be noted that the wires 408, 416, 424, 426 and 428 come from the "0" side of the five "Data Valid" flip-flops. If any one of these flip-flops is in its "0" state, OR circuit 468 will have an output which extends to AND circuit 470. Thus, if any one of the Data Valid flip-flops is in its "0" state, the CL-3 pulse will be effective to set latch 248.

Referring to FIG. 3, the active state of wire $A_{12}$ indicates the "TEST LATCH" for "0" micro-instruction. The latch is specified by the active state of one of the B wires. If the test fails, or, in other words, if the latch is found to be in its "1" state, the program branches to an address specified by the C and D fields of the micro-instruction register. Six of these $A_{12}$ micro-instructions are illustrated on FIGS. 7C & D. They involve testing wires 156, 160, 168, 172, 192 and wire 237. Wire 156 comes from the "1" side of the "SIP" latch on FIG. 6. Wire 160 comes from the "1" side of the "BIP" latch. Wire 168 comes from the "1" side of the "ADRST" latch. Wire 172 comes from the "1" side of the "STDONE" latch. Wire 192 comes from the "1" side of the "DECMD" latch. The wire 237 comes from the "1" side of the "CCF" latch of the other processor. An inspection of the circuitry on FIG. 7C will show that if any of these just mentioned latches are not on "0" the result will be to set lath 248, the action of which has been previously explained.

The active state of wire $A_{13}$ specifies the "branch M way" micro instruction. Reference to the upper portion of FIG. 7O will show that the active state of wire $A_{13}$ allows the CL-5 pulse to be applied to wire 352. Wire 352 allows the high order field of register $R_2$, (System 360 OP. Code) which is on cable 422, and the D field of the micro instruction register, which is on cable 250, to be gated to the bit-by-bit OR circuit 472. The output of this OR circuit extends to the micro instruction counter and supplies the low order bits for the address of the next micro instruction. Wire 352 also enables gate 448 in order to gate the C field of the micro-instruction register to the high order bit portion of the micro instruction counter. In this way, the branch address is assembled in the micro instruction counter.

The active state of wire $A_{14}$ specifies the "AND" micro-instruction. This instruction is executed in the ALU, which is conditioned to perform the AND function. The two registers which are gated to the ALU are specified by the active state of one of the B wires and the active state of one of the C wires. One micro-instruction of this type is illustrated at the top of FIG. 7G. The AND of wires $A_{14}$, $B_4$ and $C_5$ causes wire 354 to become active. Wire 354 extends via cable 256 to FIG. 7N where it is an input to the ALU and conditions the ALU to perform the AND operation. On FIG. 7H, wire 390 becomes active. Wie 390 extends via cable 256 to FIG. 7N where it gates the contents of register $R_5$ to cable 414 which extends to the left half of the ALU. On FIG. 7H wire 384 also becomes active. Wire 384 extends via cable 256 to FIG. 7M where it gates the contents of register $R_4$ to cable 412 which extends to the right half of the ALU.

Figure 7N:
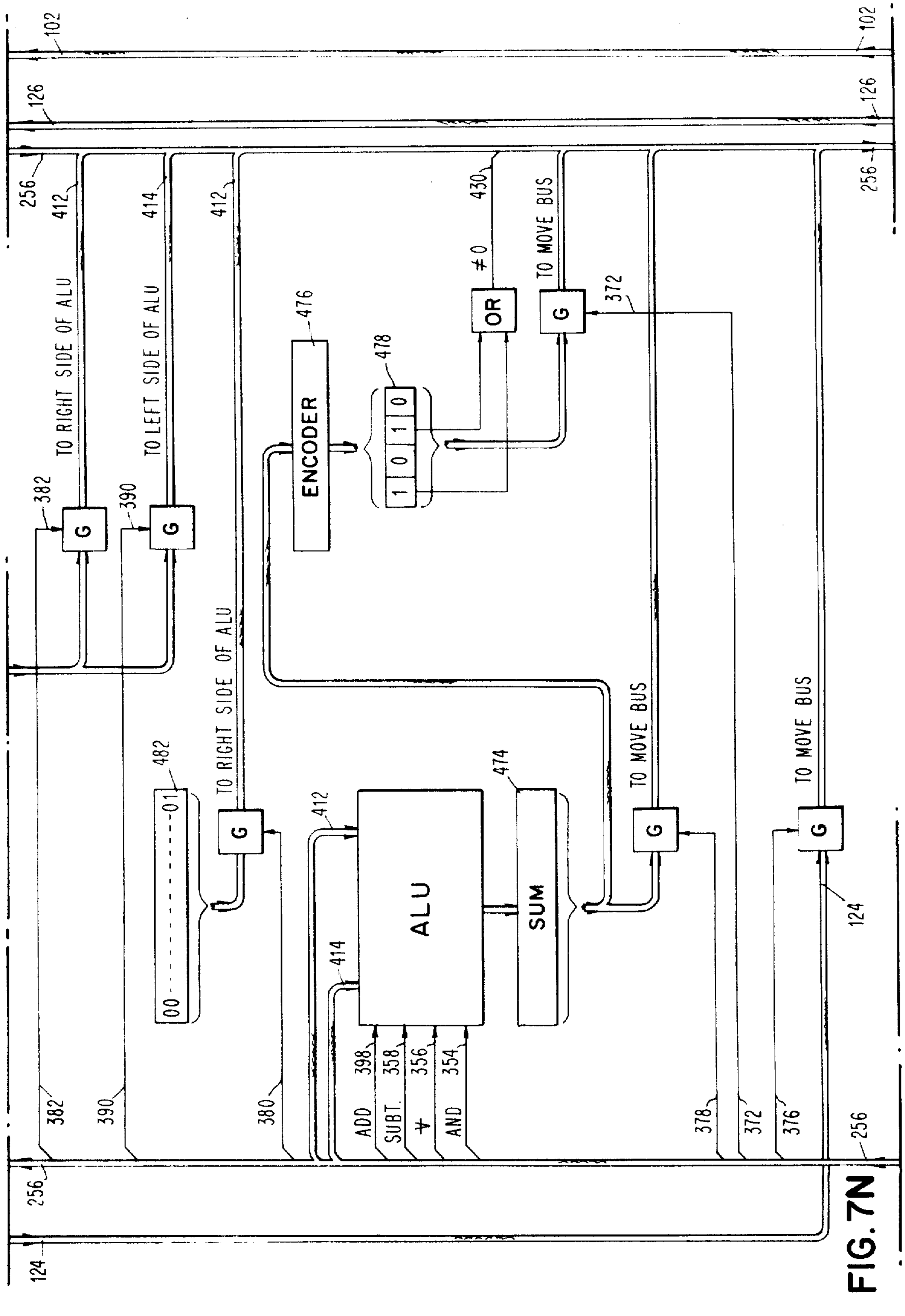
Figure 70:
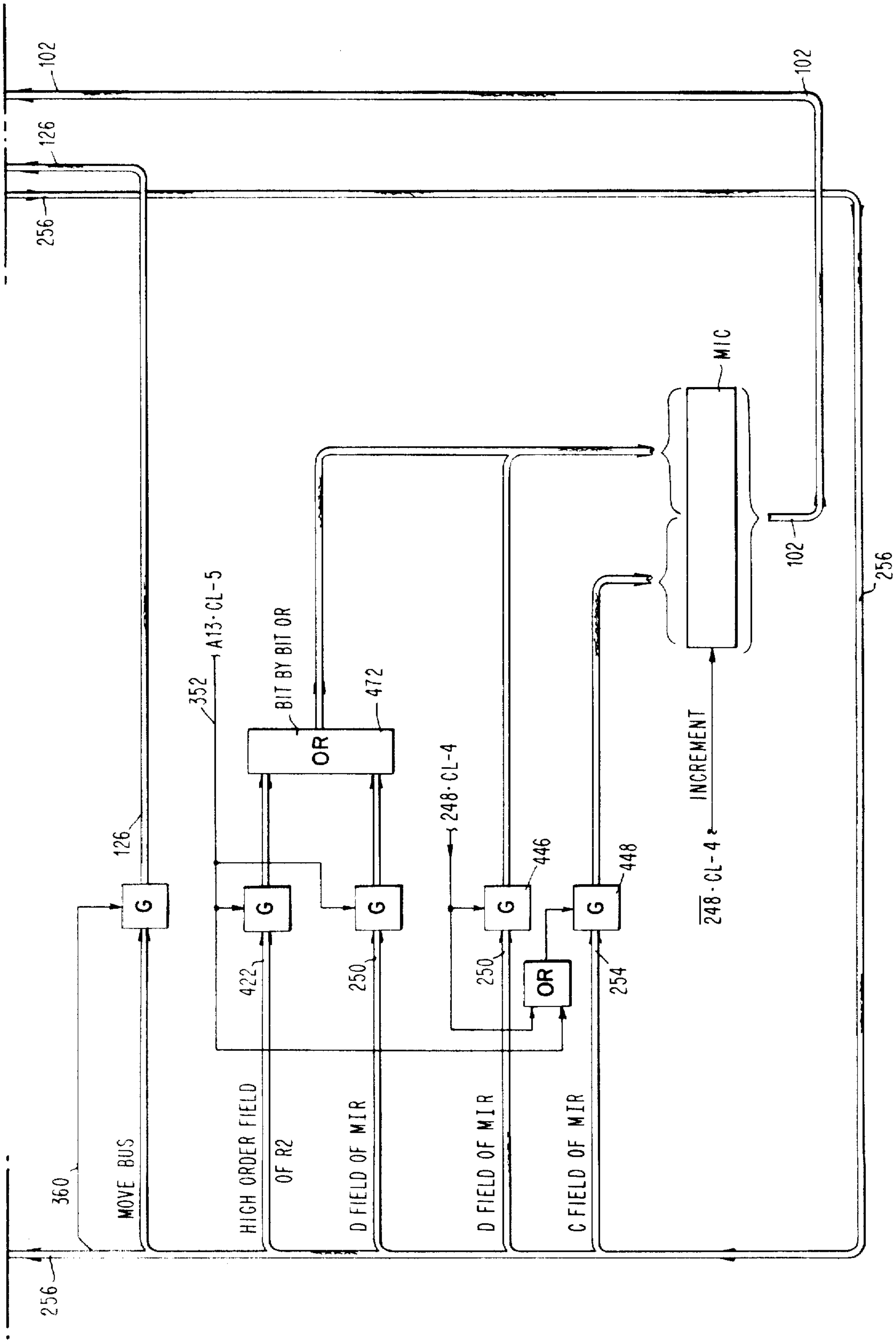

On FIG. 7N the result of the ALU operation is put into the sum register 474. The output of the sum register goes into the encoder 476 and the two-bit register 478 will be set according to four different conditions that result from the ALU operation. These conditions are as follows: If the sum register 474 contains a positive number, the two-bit register 478 is set to the binary number 10. If the sum register 474 contains a negative number the two-bit register 478 is set to the binary number 01. If the sum register 474 contains all zeros, the two-bit register 478 is set to the binary number 00. If an overflow occurs in the sum register 474, the two-bit register 478 is set to the binary number 11 (except for AND and exclusive OR operations, where overflow does not occur).

The active state of wire $A_{15}$ specifies the "ADD" micro-instruction. The R registers which contain the two operands are indicated by the active state of one of the B wires and the active state of one of the C wires. The sum of the addition is always put in the R register which is specified by the active state of the B wire. When this micro-instruction is executed, the arithmetic and logic unit is conditioned for addition. Four of these "ADD" instructions are illustrated on FIG. 7G. On FIG. 7H, wire 398 will become active. Wire 398 extends via cable 256 to FIG. 7N where it conditions the ALU for addition. On FIG. 7H wire 394 can become active. Wire 394 extends via cable 256 to FIG. 7L where it gates the contents of register R3 to the cable 414 which extends via cable 256 to the left half of the ALU. On FIG. 7H, wire 392 can become active. Wire 392 extends to FIG. 7M where it gates the contents of register $R_4$ to the left half of the ALU. On FIG. 7H, wire 390 can become active. Wire 390 extends to FIG. 7N where it gates the contents of register $R_5$ to the left of the ALU. On FIG. 7H, wire 388 can become active. Wire 388 extends to FIG. 7I where it is used to gate the contents of register $R_1$ to the right half of the ALU. On FIG. 7H, wire 386 can become active. Wire 386 extends to FIG. 7K where it gates the contents of register $R_3$ to the right half of the ALU. On FIG. 7H, wire 384 can become active. Wire 384 extends to FIG. 7M where it gates the contents of register $R_4$ to the right half of the ALU. In FIG. 7H, wire 382 can become active. Wire 382 extends to FIG. 7N where it gates the contents of register $R_5$ to the right half of the ALU.

On FIG. 7N, when the sum of the addition is in register 474, it is next necessary to move the contents of register 474 to the proper R register. This is done as follows: Referring to FIGS. 7G and H, it will be noted that the gating to the move bus and from the move bus is done by the CL-5 pulse. Wire 378 extends to FIG. 7N where it gates the contents of the sum register 474 to the move bus. On FIG. 7G, wire 362 extends to FIG. 7M where it gates the move bus to register $R_6$. On FIG. 7G, wire 434 extends to FIG. 7L where it gates the move bus to register $R_4$. On FIG. 7G, wire 364 extends to FIG. 7K where it gates the move bus to register $R_3$. On FIG. 7G, wier 366 extends to FIG. 7I where it gates the move bus to register $R_1$.

The active state of the $A_{16}$ wire indicates the "COMPARE" instruction. The two operands which are compared are in R registers which are specified by the active state of one of the B wires and the active state of one of the C wires. One of this type of instruction is illustrated on FIG. 7G. Wire 356 becomes active, which extends via cable 256 to FIG. 7N where it conditions the ALU to perform the "EXCLUSIVE OR" operation. The wires that gate the two operands to the left hand side and the right hand side of the ALU have been previously described. If the two operands are equal, the sum register 474 will contain all zeros. This will be encoded by the encoder 476 and the two bit-register 478 will be set to the binary number 00. Wire 430 on FIG. 7N will be active if the result of the EXCLUSIVE OR operation is not all zeros in the sum register 474.

The wire $A_{17}$ is active when a "Branch On Result of ALU Operation Not Equal to Zero" micro instruction is desired. This instruction tests the result of the preceding ALU operation, and if the result of the operation is not 0, it will caue a branch to an address specified by the C and D fields of the micro-instruction register. This type of micro-instruction is illustrated at the top of FIG. 7D. Here it will be noted that wire 430 is one input to the AND circuit 480. The active state of wire $A_{17}$ allows the CL-3 pulse to be applied to AND circuit 480. If this AND circuit has an output, latch 248 will be set to its "1" state.

The active state of wire $A_{18}$ indicates the "Decrement" micro-instruction. This micro-instruction is executed in the ALU, which is conditioned for "Subtract." The register which is to be decremented is indicated by the active state of one of the B wires. The "1" which is subtracted from this register comes from a special register. One of this type of micro-instruction is illustrated on FIG. 7G. Wire 358 becomes active, which extends via cable 256 to FIG. 7N, where it conditions the ALU for subtract. On FIG. 7H, wire 390 becomes active, which as explained before, gates the contents of register $R_6$ to the left half of the ALU. On FIG. 7H, wire 380 becomes active, which extends via cable 256 to FIG. 7N where it gates the contents of register 482 to the right half of the ALU. On FIG. 7H, wire 378 will become active which gates the sum register on FIG. 7N to the move bus. On FIG. 7G, wire 362 will become active which gates the move bus to register $R_6$.

On FIG. 3, the active state of wire $A_{19}$ indicates the "Increment" micro-instruction. This micro-instruction is similar to the one just described, except that the "1" contained in the register 482 on FIG. 7N is added to the R register specified. One of this type of micro-instruction is illustrated in FIG. 7G. Wire 398 becomes active on FIG. 7H in order to condition the ALU for addition. Wire 396 on FIG. 7I becoms active in order to gate register $R_1$ to the left half of the ALU. Wire 380 becomes active in order to gate the "1" in register 482 to the right half of the ALU. On FIG. 7H, wire 378 becomes active in order to gate the sum register to the move bus. On FIG. 7G, wire 366 becomes active in order to gate the mov e bus to register $R_1$.

The active state of the $A_{20}$ wire indicates the "Move" micro-instruction on FIG. 3. The destination of the move is indicated by the active state of one of the B wires, and the source of the move is indicated by the active state of one of the C wires. This instruction has been explained to some extent in connection with the "ADD" micro-instruction. Two micro-instructions which are concerned with the condition code register will be explained. The first of these micro-instructions is concerned with moving the contents of the two-bit register 478 on FIG. 7N to the shared condition code register shown on FIG. 6. This micro-instruction is coded $A_{20} \cdot B_5 \cdot C_{10}$. Referring to FIG. 7G, wire 360 becomes active. Wire 360 extends to FIG. 7O where it gates the move bus to cable 126. Cable 126 extends via cable 118 to FIG. 6, where it loads the shared condition code register. Also on FIG. 7H, wire 372 becomes active which extends to FIG. 7N and gates the contents of the two-bit register 478 to the move bus.

The second of these two move micro-instructions concerns moving the shared condition code register to register $R_5$. This micro-instruction is coded as $A_{20} \cdot B_4 \cdot C_7$. On FIG. 7H wire 376 will become active. Wire 376 extends via cable 256 to FIG. 7N where it gates cable 124 to the move bus. Cable 124 comes from FIG. 6 and contains the contents of the shared condition code register. On FIG. 7G, wire 362 becomes active. Wire 362 extends via cable 256 to FIG. 7N where it gates the move bus to register $R_5$.

The active state of wire $A_{21}$ specifies the "Branch Unconditional" micro-instruction. To execute this micro-instruction, the normal incrementing of the micro-instruction counter is inhibited and the contents of the micro-instruction counter are replaced by the C and D fields of the micro-instruction register. This merely involves setting latch 248 on FIG. 7D to its "1" state. Latch 248 is reset to its "0" state at the end of the processor cycle by the R pulse.

The active state of wire $A_{22}$ indicates the "Reset Register to All Zeros" micro-instruction. Register $R_1$ is reset by a pulse on wire 400, FIG. 7H. On FIG. 7J register $R_2$ is reset by a pulse on wire 402. On FIG. 7K the register $R_3$ is reset by a pulse on wire 404. FIG. on FIG. 7L register $R_4$ is reset by a pulse on wire 432. On FIG. 7M the register $R_5$ is reset by a pulse on wire 406.

Some mention should be made about the "Availability Bits" which are referred to in the flowcharts. The "Availability Bits": are kept in Local Store. They constitute the high order bit of words in the Local Store. There is one word in Local Store for each availability bit and there are the same number of availability bits as there are registers concerned in the target (emulated) computer. In this embodiment, in order to test an availability bit, the word from Local Store containing the bit must be brought into register $R_1$. This is done by the usual "Read Local Store Indirect" micro-instruction. The low order address bits for the Local Store are obtained from either the $r_1$ field or the $X_2$ field of the $R_2$ register, and the high order bits of the Local Store address are obtained from the D field of the micro-instruction register. After the "Read Local Store Indirect" instruction is executed, the left-hand bit of the $R_1$ register is tested by the micro-instruction $A_{12}$.

CONCLUSIONS

The above description of the specific operation of the system clearly sets forth the operation of the herein disclosed exemplary embodient. As has been stated previously, in any large computer system certain design decisions must, of necessity, be somewhat arbitrary. For example, any time greater speed for a particular type of operation is required, it is always possible to provide more high-speed hardware. Alternatively, if in certain areas the designer feels a little more time can be taken, usually the same job can be done with, for example, several micro-program sequences and less hardware. Thus, the present embodiment represents certain design compromises wherein the overall objectives of the invention are satisfied without unduly complicating the hardware.

It should be reiterated that the actual micro-program sequences illustrated represent only a small fraction of the necessary operations which an overall complete computing system would have to incorporate.

Further, in the present embodiment only two processors are shown whereas it should be understood that there could be three or more processors requiring, of course, considerably more complex interlocking circuitry to again prevent unwanted interference between two or more processors trying to perform related or interdependent operations at the same time. If three processors were utilized, for example, the individual clocks for each could be three-phase rather than two-phase, which would avoid certain interferences; however, many additional interlocks would have to be provided to insure proper operation of the system.

Also in a more complex system the reservation of areas in local storage for use as a scratch pad private to each processor would have to work in a somewhat more sophisticated manner than when only two processors are used. The use of scratch pad storage has not been illustrated in the present embodiment.

Availability bits for the various emulated registers have been embodied herein in local storage locations. However, it should be clearly understood that these availability bits could also be embodied in separate hardware latches. Also, the means for testing and setting various of the latches and interlocks could be readily changed by adding hardware and reducing the number of microlinstruction steps required, as will be apparent to those skilled in the art.

Further, in the present system there is no indication of just how interrupts would be processed. As is well known, there has to be some method provided in such systems for handling certain interrupt conditions such as for input output or signals from external devices. However, these are thought to be well known in the art and any attempt to detail the ways in which interrupts might be handled was though to add nothing to the overall concepts of the present invention and would merely tend obfuscate.

One simple way of handling interrupts would be to allow a given processor to always finish its current operation and then check for any interrupts at the end of each execution phase. Obviously, for some systems this might not be sufficient. Also, no specific means of handling I/O traps (for high priority I/O activity) is set forth. However, these are similar to interrupts and could be handled similarly.

Finally, the present overall system has been set forth and described assuming that the processors disclosed would handle sequentially any machine language instructions. It would be possible, of course, to modify this mode of operation without departing from the essential concepts of the invention. For example, one of the processors might be designated to handle instruction fetching operations; whereas, the other one might be dedicated to the execution phase. In this case, additional local store space and obviously additional microinstructions would have to be provided to control the system.

The presently disclosed embodiment has indicated that main, local and a program storage are embodied in more or less conventional random access memories; however, it should be clearly understood that the storage functions could be equally well performed by register arrays in whole or in part or any other means for storing information.

Further, although in the present embodiment it is necessary for the processors to share the local store and the interlocks (shared latches) in order to have the required interactions, each processor would have its own control store or could alternatively be hard wired to provide the required control.

As a further aspect of such a system, it would be possible not only to have a processor dedicated to a particular type of function, but also to have sufficient control flexibility so that either processor could, with minimum difficulty switch over to a different mode of operation. For example, a processor that had been dedicated to instruction processing could revert to execution phase processing, assuming there were no more instruction fetches to be processed, or where the execution stack was getting overly large. However, even with this modified method of operation, the basic concepts of the present invention would hold true; namely, the multiprocessing function would be occurring at the instruction level, and also there would be a very high degree of interaction between the processors due to the sharing of micro-instruction store, local store, main store and a plurality of shared interlock latches.

These and other modifications would be apparent to one skilled in the art. It should be clearly understood that the presently disclosed broad concepts of instruction level multi-processing, shared micro-instruction store, local store and main store, etc., are the more basic concepts of the present invention and that particular embodiments could vary greatly from that disclosed herein.

What is claimed is:

1. A multi-processor computing system for processing a single machine language instruction list comprising:

a plurality of separate processor elements, each processor element having a separate control means for providing sequences of instructions to its associated processor for execution;

a common storage means accessible to each of said plurality of processor elements;

each control means including means for sharing said common storage means, and a plurality of interlocks for preventing unwanted interaction among said plurality of processors;

each said control means further including means for initiating control sequences controllng the operation of each of said processors;

each said control means further including means for accessing successive machine language instructions from said storage means submitted to said multiprocessing system for execution; and said initiating means including means for converting each machine language instruction into actual electrical signal sequences suitable for the direct control of the associated processor.

2. A multi-processor computing system as set forth in claim 1 wherein said control means further includes means for sharing a micro-instruction store, said micro-instruction store containing the actual control sequences for controlling the operation of each of said processors, and said means for converting including means for decoding said micro-instructions to produce said multiprocessor control signals.

3. A multi-processor computing system as set forth in claim 2 wherein said common storage means includes a separately accessible main storage and a separately accessible local storage and wherein interlock means are provided whereby only one processor may access either of said storage means at any one time.

4. A multi-processor computing system as set forth in claim 1 wherein said control means includes means for sequentially accessing said single machine language instruction list for the next unaccessed instruction therein each time the associated processor has completed a current instruction from said list whereby instructions are accessed by a given processor on a "first-come-first served" basis.

5. A multi-processor computing system comprising:

a plurality of separate processor elements, each processor element having a separate control means for providing sequences of instructions to its associated processor for execution;

a main storage means accessible to each of said plurality of separate processors;

each control means including means for sharing said main storage, a local storage, and a plurality of interlocks for preventing unwanted interaction among said plurality of processors;

each said control means further including means for sharing a micro-instruction store, said micro-instruction store containing the actual control sequences for controlling the operation of each of said processors;

each said control means further including means for accessing successive machine language instructions from a system instruction list stored in said main storage which are submitted to said multiprocessing system for execution; and means for converting said machine language instructions into micro-instruction sequences suitable for direct execution on one of said plurality of processors.

6. A multi-processor computing system as set forth in claim 5 wherein said means for converting machine language instructions into microprogram sequences includes means for accessing a particular field of said machine language instruction and deriving an address in said micro-instruction store, and means for utilizing said address as an entry point into a micro-instruction sequence for performing the operation called for in said machine language instruction.

7. A multi-processor computing system as set forth in claim 6 including means for determining if all or only part of an accessed machine language instruction can be performed immediately or must await the performance of some part of a previous instruction.

8. A multi-processor computer system as set forth in claim 5 wherein at least some of said shared interlocks comprise hardware latches;

said control means include means for testing and setting each of said latches under appropriate microinstruction control;

means for preventing a given processor control means from proceeding with a particular operation when a particular one of said latches is set to a predetermined condition whereby unwanted interaction between said processors is prevented.

9. A multi-processor computing system as set forth in claim 8 including means for both testing and setting an interlock in a single processor cycle whereby an erroneous test for a latch condition cannot be made by another processor before said latch can be set by the first testing processor.

10. A multi-processor computer system as set forth in claim 9 wherein said control means for each processor includes means for sequentially accessing successive unaccessed machine language instructions from memory each time the associated processor has completed a current instruction whereby one processor may perform a number of successive instructions while another processor is performing a single instruction.

11. A multi-processor computer system as set forth in claim 10 said control means for each processor including means for preventing a processor from proceeding with a task requiring any operands which are to be obtained from a previous instruction until such operands are available, said means including means for setting an availablilty bit in a specified register which is designated for holding the results of such previous operations wherein the same register is designated in the subsequent operation when the result of the preceding operation is to be used as an operand in a subsequent operation, said availability bit being tested by the control means associated with a given processor before any given operation is performed, and means for suspending operation of that processor until the availablility bit of the specified register is set to a predetermined "go-ahead" condition.

12. A multi-processor computer system as set forth in claim 10, said control means including further means for prohibiting its associated processor from accessing an instruction stored in said main storage means which may be altered by another processor.

13. A multi-processor computer system as set forth in claim 11, wherein each control means for each processor further includes means associated with said main store for preventing its associated processor from accessing an operand address therein which address is to be used by another processor currently executing a store instruction, precedent in time to the current instruction.

14. A multi-processor computer system as set forth in claim 10, wherein said control means includes means for prohibiting the testing and setting of condition-indicating data in the wrong sequence, said means including interlocks whereby if an operation is currently affecting said condition-indicating data, said data cannot be accessed by another operation logically subsequent to the one currently being performed until said current operation has an opportunity to modify the condition data as required.

15. A multi-processor computer system as set forth in claim 14 wherein said condition indicating data comprises a condition code data field, and interlock means are provided to prevent a subsequent operation from accessing said condition code before an operation currently undergoing execution has finished with the instruction at least implicitly modifying said condition code.

16. A multi-processor computer system as set forth in claim 14 wherein said condition containing data comprises a condition code field accompanying other data, said means for preventing the improper altering of said condition code including means for preventing the testing of the current state of said condition code by a given processor before a processor currently executing an instruction at least implicitly modifying said condition code has completed said instruction.

* * * * *